United States Patent
Yamamoto

[11] Patent Number: 5,999,331
[45] Date of Patent: Dec. 7, 1999

[54] ZOOM LENS SYSTEM

[75] Inventor: Yasushi Yamamoto, Kishiwada, Japan

[73] Assignee: Minolta Co., Ltd., Osaka, Japan

[21] Appl. No.: 09/019,858

[22] Filed: Feb. 6, 1998

[30] Foreign Application Priority Data

Feb. 7, 1997 [JP] Japan .................................. 9-024936
Apr. 10, 1997 [JP] Japan .................................. 9-092421

[51] Int. Cl.⁶ .............................. G02B 15/14; G02B 3/02
[52] U.S. Cl. ........................... 359/692; 359/717; 359/740
[58] Field of Search ................................. 359/692, 691, 359/717, 740

[56] References Cited

U.S. PATENT DOCUMENTS

| | | | |
|---|---|---|---|
| 4,836,660 | 6/1989 | Ito | 359/692 |
| 5,526,187 | 6/1996 | Lee | 359/692 |
| 5,541,772 | 7/1996 | Lin | 359/692 |
| 5,585,971 | 12/1996 | Itoh | 359/692 |
| 5,610,767 | 3/1997 | Ito | 359/692 |
| 5,666,233 | 9/1997 | Ogata | 359/692 |
| 5,675,440 | 10/1997 | Kanamori | 359/692 |
| 5,757,556 | 5/1998 | Nishimura | 359/692 |
| 5,777,800 | 7/1998 | Yamaguchi et al. | 359/692 |

FOREIGN PATENT DOCUMENTS

| | | |
|---|---|---|
| 4-204615 | 7/1992 | Japan . |
| 5-19166 | 1/1993 | Japan . |
| 7-225337 | 8/1995 | Japan . |

*Primary Examiner*—Georgia Epps
*Assistant Examiner*—Evelyn A. Lester
*Attorney, Agent, or Firm*—Morrison & Foerster LLP

[57] ABSTRACT

A zoom lens system has, from the object side, a first lens unit having a positive optical power and a second lens unit having a negative optical power. The second lens unit is provided at the image side of said first lens unit with a variable air space formed between said first and second lens units. The zooming from the shortest focal length condition to the longest focal length condition is performed by decreasing said variable air space. The zoom lens system fulfills the following conditions:

$$\tan \omega W \geq 0.7$$

$$1.25 < \frac{fT}{TLW} \cdot \tan \omega W < 1.5$$

where,
  $\omega W$ represents a half angle of view in the shortest focal length condition;
  $fT$ represents a focal length of the entire zoom lens system in the longest focal length condition; and
  TLW represents a total length of the entire zoom lens system (a distance between a summit of the most object side surface of the entire lens system and the image plane).

19 Claims, 16 Drawing Sheets

FNO =5.82

—— d
------ SC

-0.5   0.5
SPHERICAL ABERRATION
SINE CONDITION

Y' =17.2

------ DM
—— DS

-0.5   0.5
ASTIGMATISM

Y' =17.2

-5.0   5.0
DISTORTION %

FNO =6.20

—— d
------ SC

-0.5   0.5
SPHERICAL ABERRATION
SINE CONDITION

Y' =17.2

------ DM
—— DS

-0.5   0.5
ASTIGMATISM

Y' =17.2

-5.0   5.0
DISTORTION %

FNO =8.40

—— d
------ SC

-0.5   0.5
SPHERICAL ABERRATION
SINE CONDITION

Y' =17.2

------ DM
—— DS

-0.5   0.5
ASTIGMATISM

Y' =17.2

-5.0   5.0
DISTORTION %

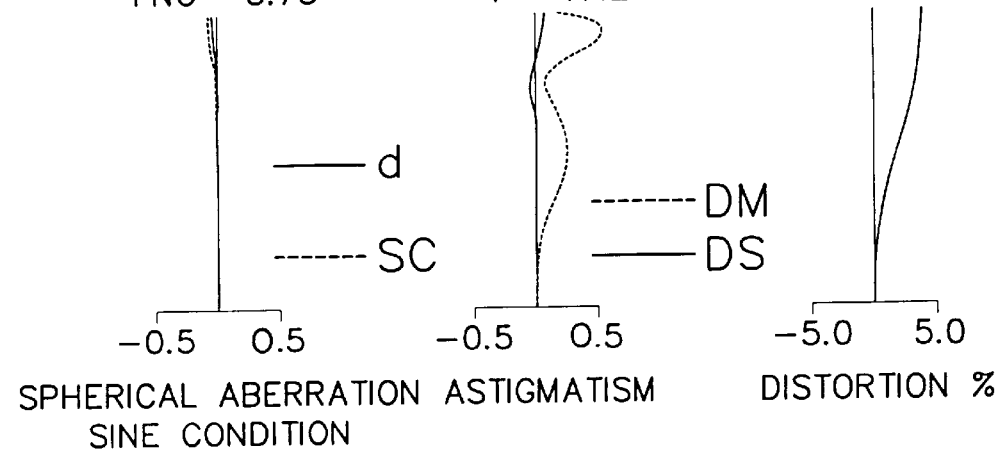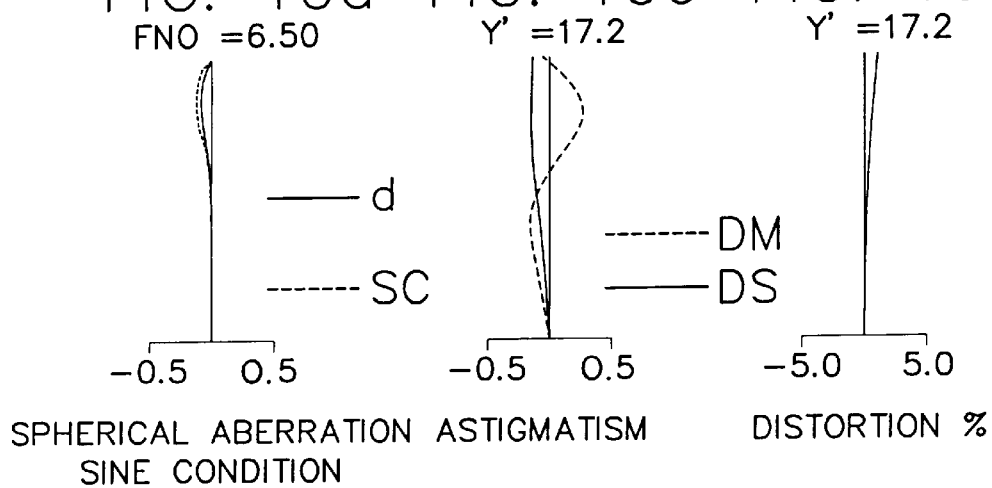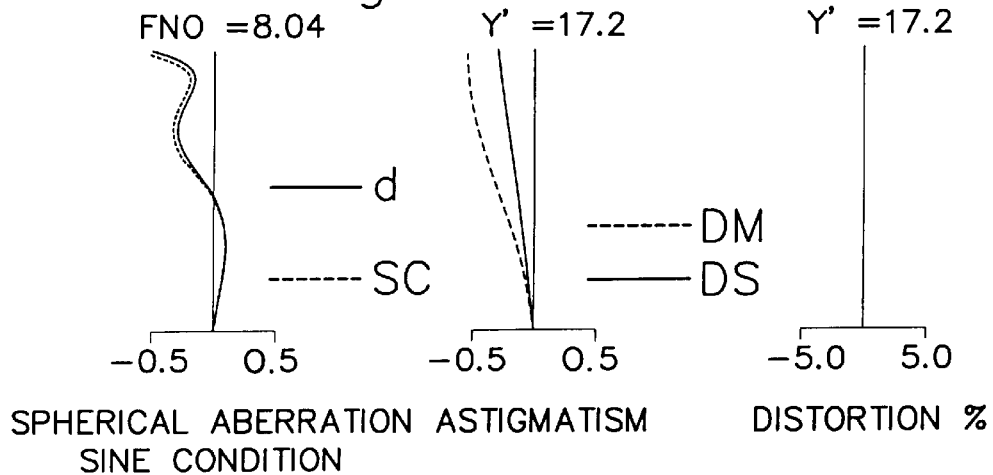

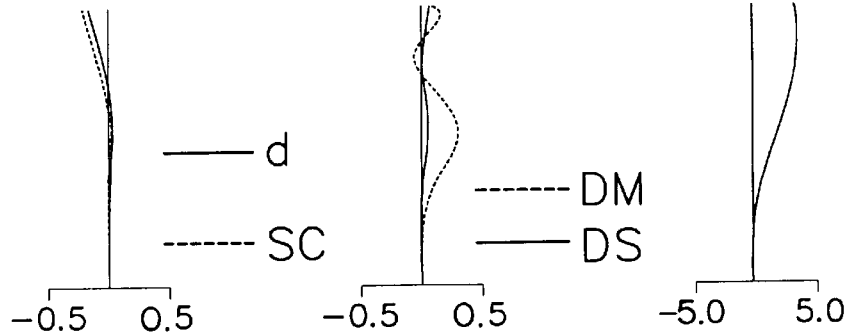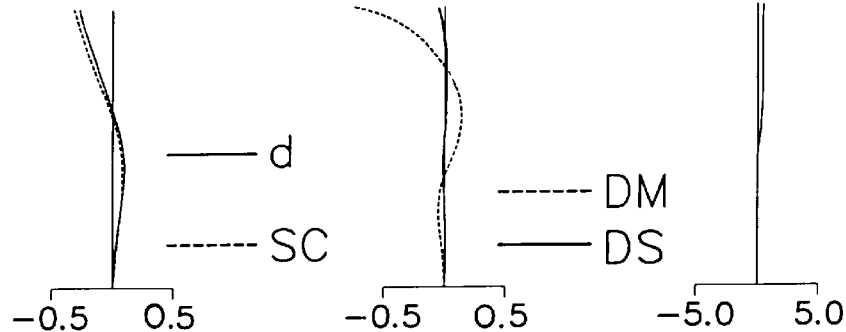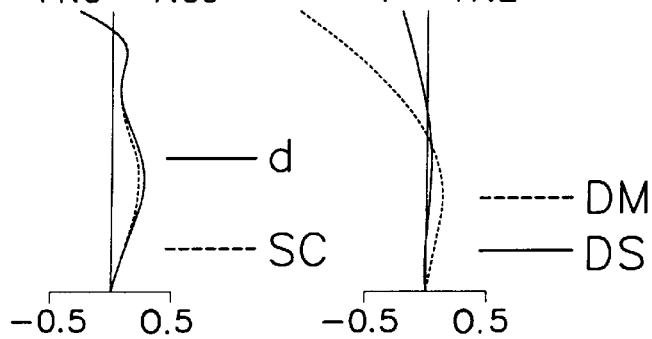

FIG. 12a
FNO =5.85
— d
------ SC
-0.5  0.5
SPHERICAL ABERRATION
SINE CONDITION
FIG. 12b
Y' =17.2
------ DM
— DS
-0.5  0.5
ASTIGMATISM
FIG. 12c
Y' =17.2
-5.0  5.0
DISTORTION %
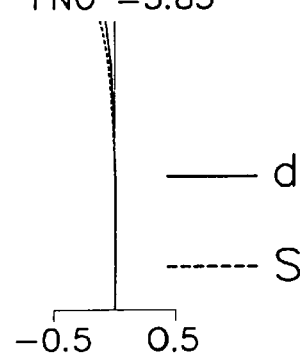
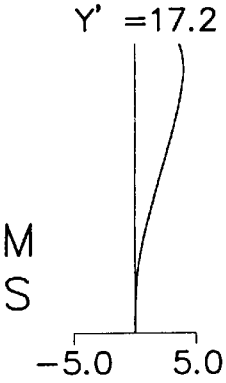
FIG. 12d
FNO =6.50
— d
------ SC
-0.5  0.5
SPHERICAL ABERRATION
SINE CONDITION
FIG. 12e
Y' =17.2
------ DM
— DS
-0.5  0.5
ASTIGMATISM
FIG. 12f
Y' =17.2
-5.0  5.0
DISTORTION %
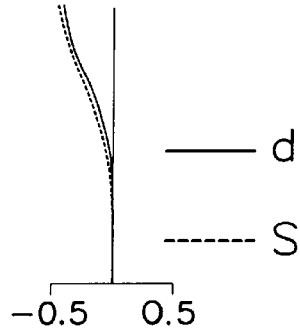
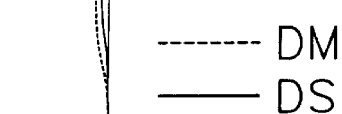
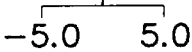
FIG. 12g
FNO =10.02
— d
------ SC
-0.5  0.5
SPHERICAL ABERRATION
SINE CONDITION
FIG. 12h
Y' =17.2
------ DM
— DS
-0.5  0.5
ASTIGMATISM
FIG. 12i
Y' =17.2
-5.0  5.0
DISTORTION %
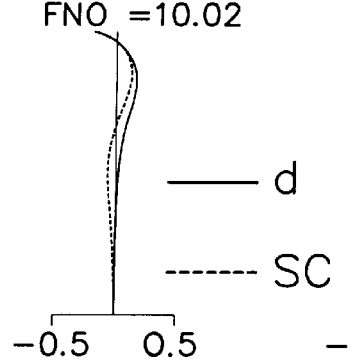
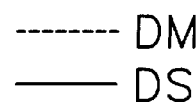

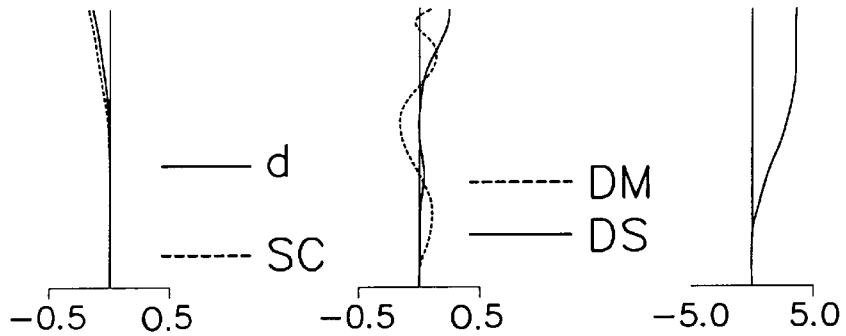
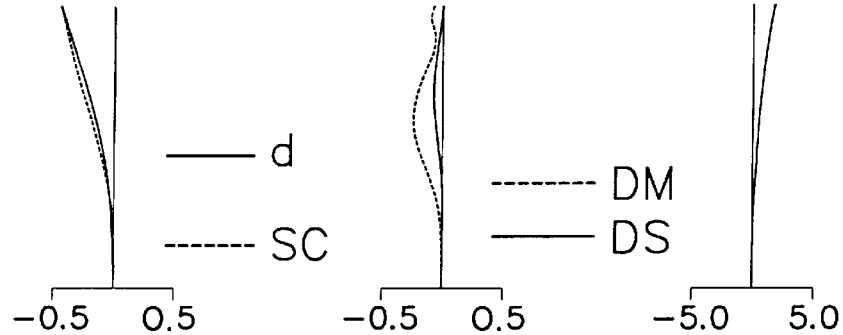
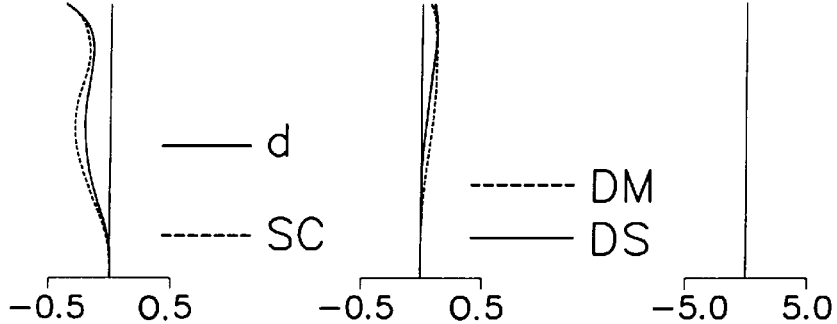

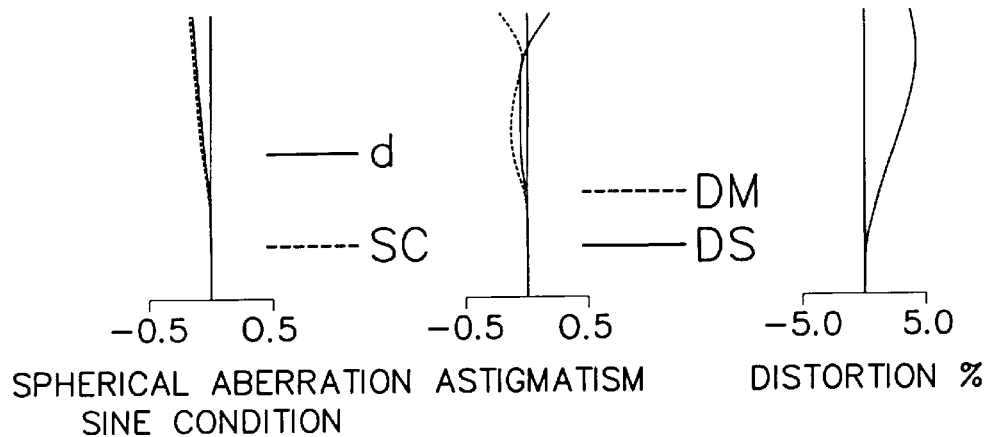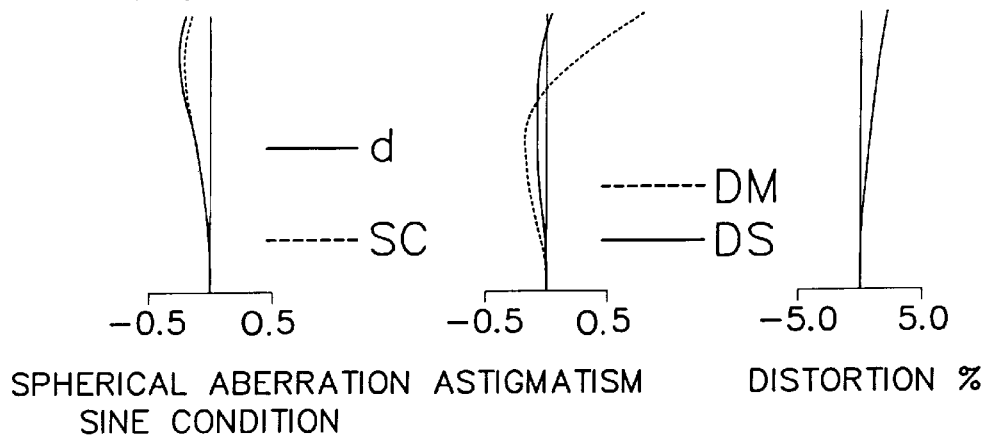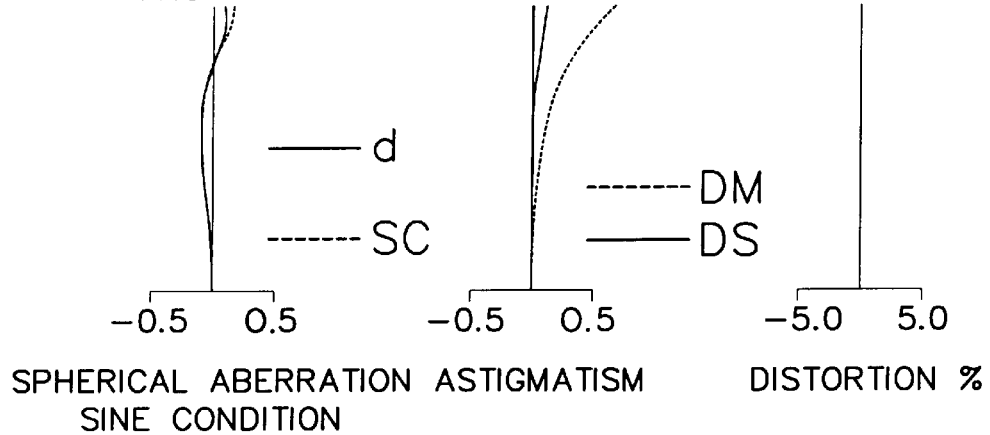

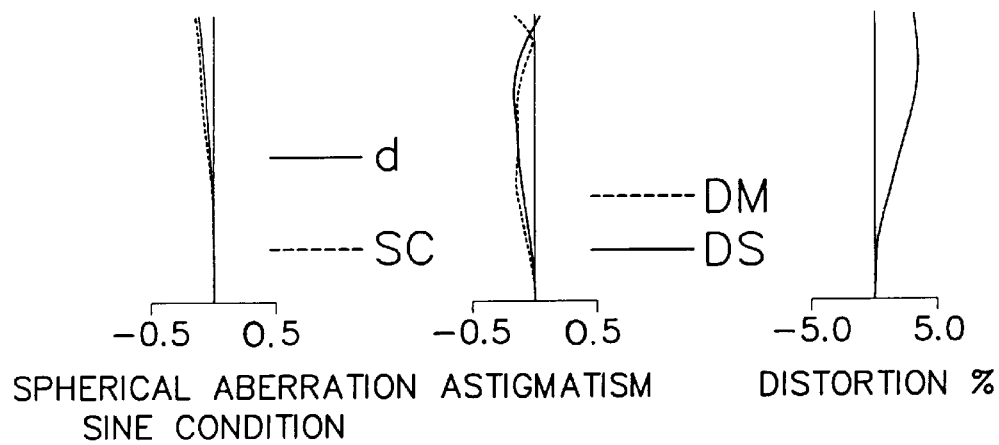
FIG. 15a FNO =5.50
FIG. 15b Y' =17.2
FIG. 15c Y' =17.2
SPHERICAL ABERRATION
SINE CONDITION
ASTIGMATISM
DISTORTION %
FIG. 15d FNO =6.2
FIG. 15e Y' =17.2
FIG. 15f Y' =17.2
SPHERICAL ABERRATION
SINE CONDITION
ASTIGMATISM
DISTORTION %
FIG. 15g FNO =6.8
FIG. 15h Y' =17.2
FIG. 15i Y' =17.2
SPHERICAL ABERRATION
SINE CONDITION
ASTIGMATISM
DISTORTION %

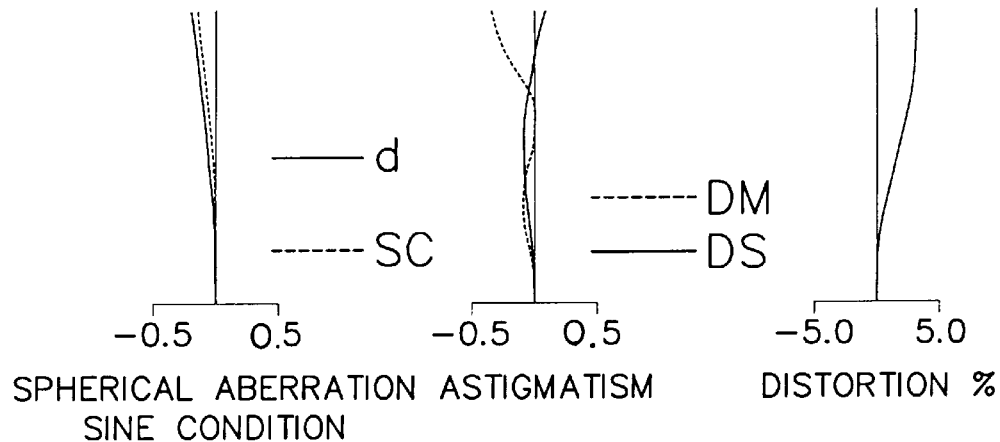
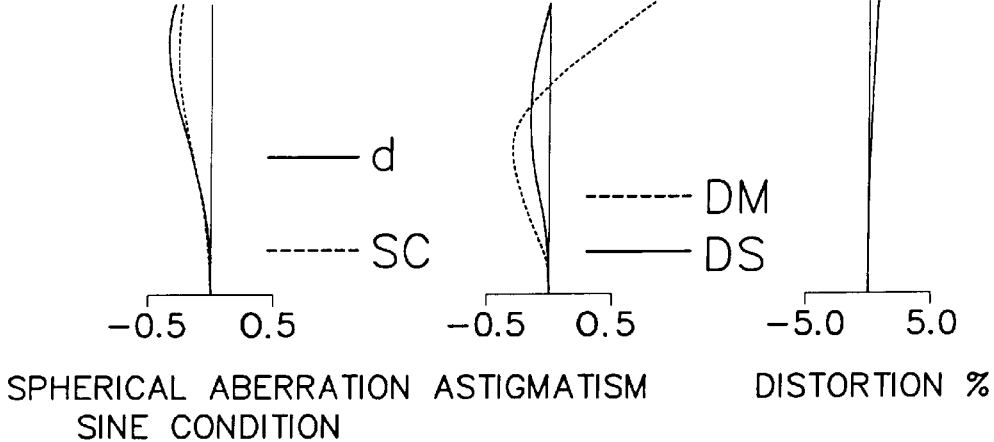
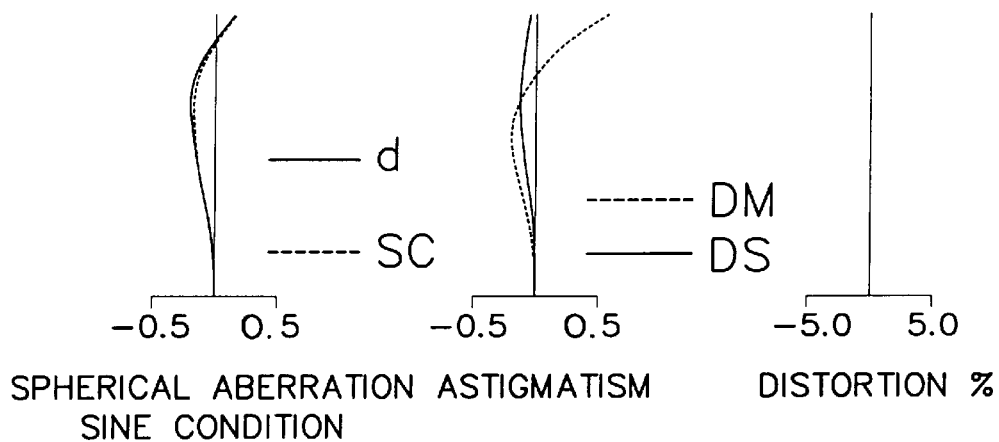

ZOOM LENS SYSTEM

This application is based on application Nos. H9-92421 and H9-24936 filed in Japan, the contents of which are hereby incorporated by references.

BACKGROUND OF THE INVENTION

1. Field of the Invention

The present invention relates to a zoom lens system, for example, a compact, high magnification zoom lens system suitable for lens shutter camera photographic lenses.

2. Background of the Invention

Zoom lens systems for lens shutter cameras comprising sequentially from the object side a first lens element having positive optical power, and second lens element having negative optical power have been variously proposed to achieve compactness. In such lens shutter type zoom lens systems, it is strongly desirable to achieve high field angle and high magnification while maintaining a compact structure.

Zoom lens systems for lens shutter cameras have been proposed in response to said desires, e.g., Japanese Laid-Open Patent Application Nos. H4-204615 and H5-19166 which disclose zoom lens systems which include a wide angle of field from 70 degrees to 80 degrees. Furthermore, Japanese Laid-Open Patent Application No. H7-252337 discloses a zoom lens system with a zoom ratio of about 3×.

The zoom lens systems disclosed in Japanese Laid-Open Patent Application Nos. H4-204615 and H5-19166 achieve a wide angle of field up to about 80 degrees at the shortest focal length. Since the number of lens elements are 7 and 9, however, these arrangements cannot be said to be adequate from the perspectives of number of components and compactness.

Moreover, although the zoom lens systems disclosed in Japanese Laid-Open Patent Application No. H7-252337 provides a zoom ratio of about 3×, this system does not achieve sufficient compactness due to the significantly large amount of movement of each lens element when zooming.

OBJECTS AND SUMMARY

In view of the aforesaid disadvantages, an object of the present invention is to provide a compact zoom lens system using a low number of components and having a field angle of about 80 degrees at the shortest focal length.

Another object of the present invention is to provide a compact zoom lens system provided with a zoom ratio of about 2× to 3×.

These objects are attained by a zoom lens system comprising, from the object side, a first lens unit having a positive optical power; and a second lens unit having a negative optical power, said second lens unit being provided at the image side of said first lens unit with a variable air space formed between said first and second lens units, wherein the zooming from the shortest focal length condition to the longest focal length condition is performed by decreasing said variable air space, and wherein the zoom lens system fulfills the following conditions:

$$\tan \omega W \geq 0.7$$

$$1.25 < \frac{fT}{TLW} \cdot \tan \omega W < 1.5$$

where,
  $\omega W$ represents a half angle of view in the shortest focal length condition;
  $fT$ represents a focal length of the entire zoom lens system in the longest focal length condition; and
  $TLW$ represents a total length of the entire zoom lens system in the shortest focal length condition.

These objects are attained by another zoom lens system comprising, from the object side, a first lens unit having a positive optical power, said first lens unit being constituted, from the object side, a first negative lens sub-unit, a diaphragm, a second negative lens sub-unit and a third positive lens sub-unit; and a second lens unit having a negative optical power, said second lens unit being provided at the image side of said first lens unit with a variable air space formed between said first and second lens units, wherein the zooming from the shortest focal length condition to the longest focal length condition is performed by decreasing said variable air space.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 10a~10i show aberration curves of the second embodiment;

FIGS. 11a~11i show aberration curves of the third embodiment;

FIGS. 12a~12i show aberration curves of the fourth embodiment;

FIGS. 13a~13i show aberration curves of the fifth embodiment;

FIGS. 14a~14i show aberration curves of the sixth embodiment;

FIGS. 15a~15i show aberration curves of the seventh embodiment; and

FIGS. 16a–16i show aberration curves of the eighth embodiment.

DETAILED DESCRIPTION OF THE PREFERRED EMBODIMENTS

Figure 1:
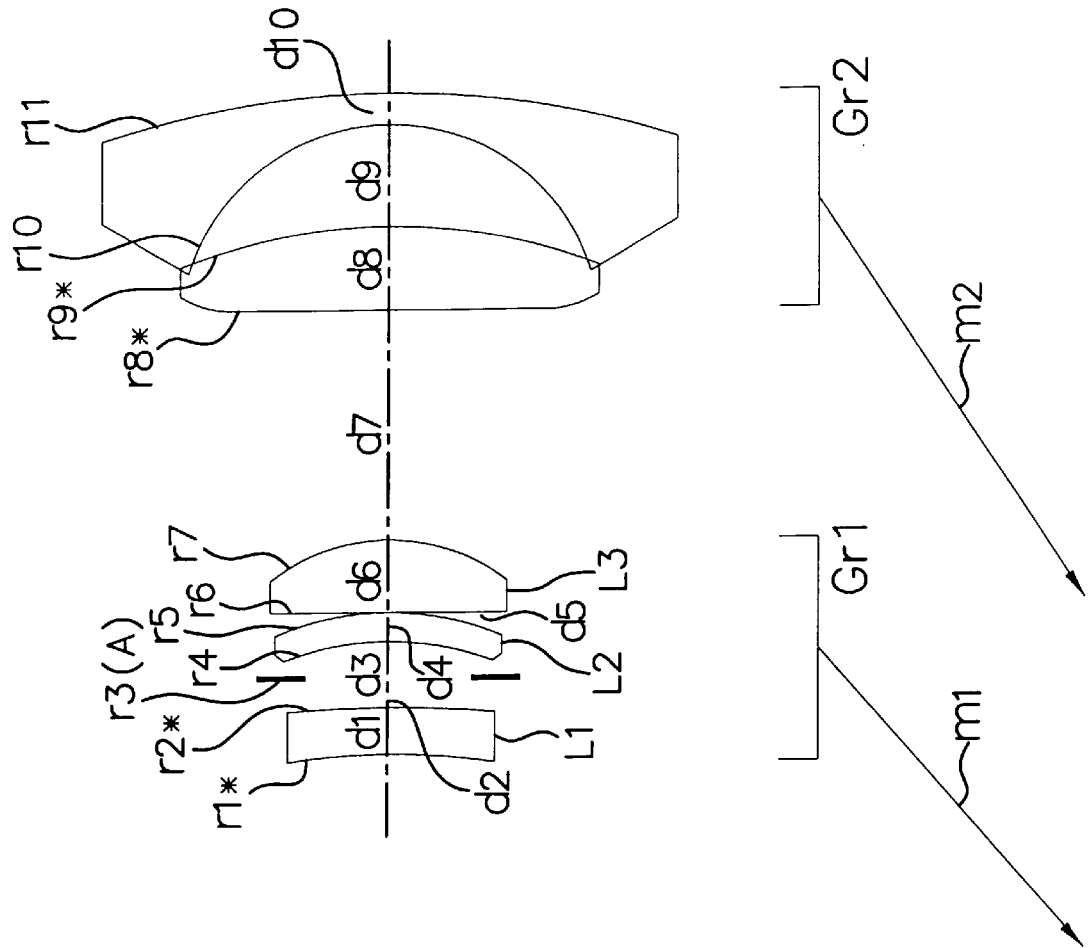
FIG. 1 shows the construction of a first embodiment of a zoom lens system.
Figure 2:
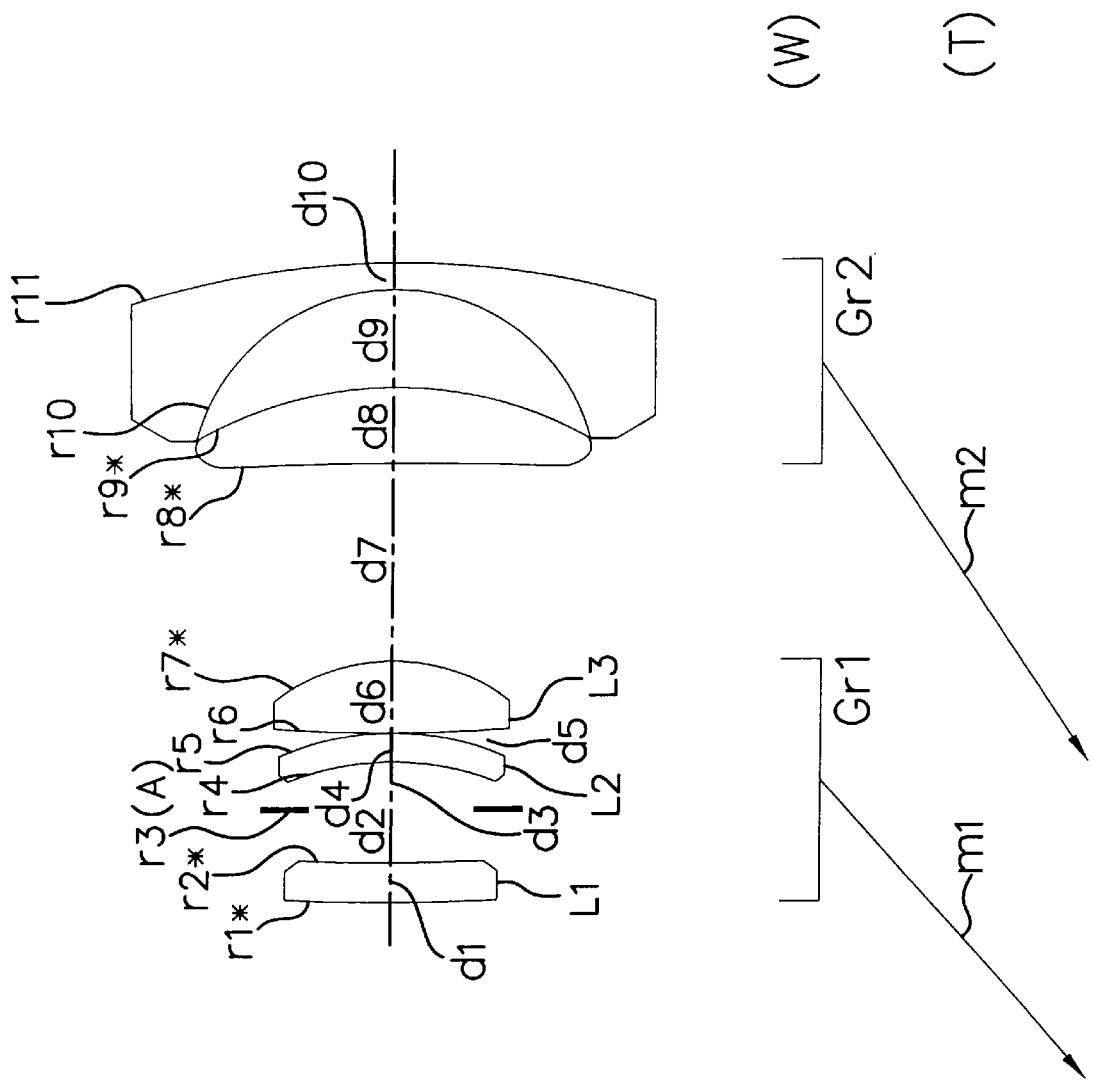
FIG. 2 shows the construction of a second embodiment of a zoom lens system.
Figure 3:
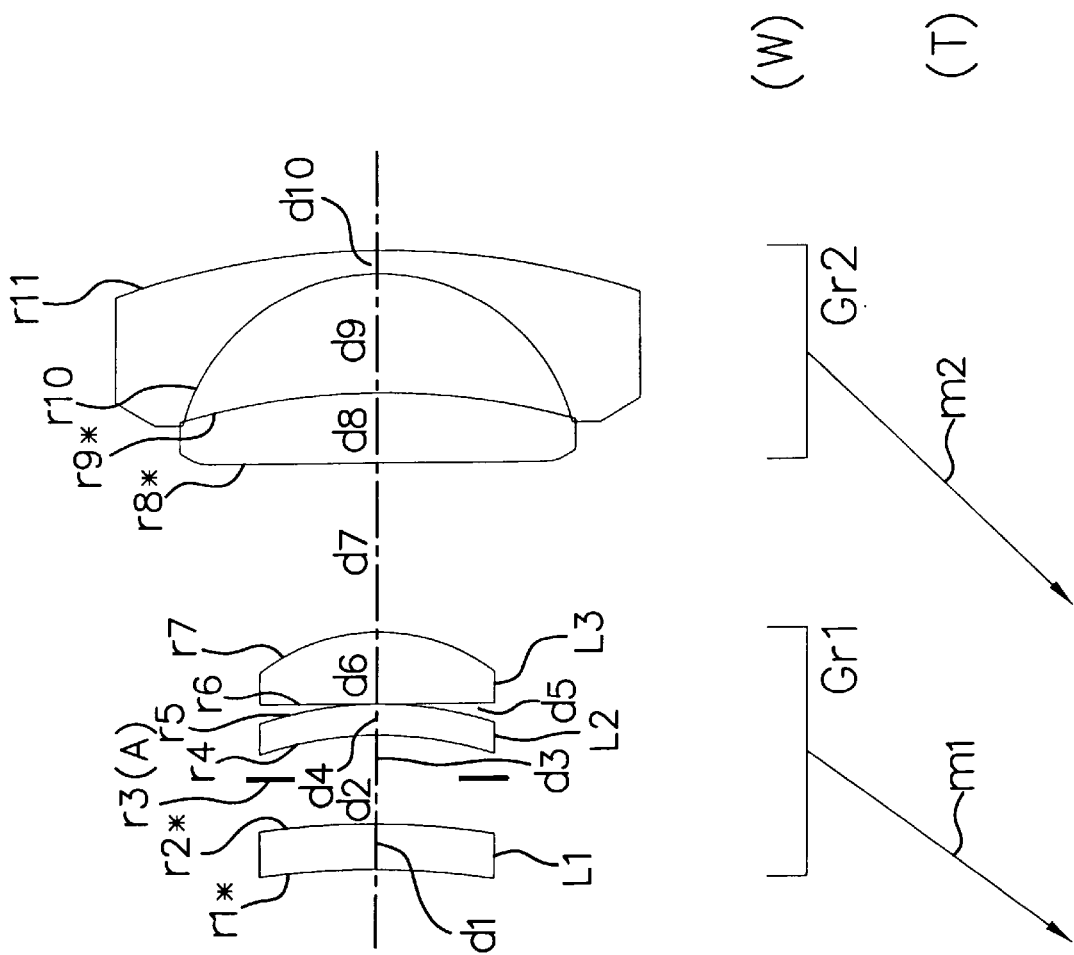
FIG. 3 shows the construction of a third embodiment of a zoom lens system.
Figure 4:
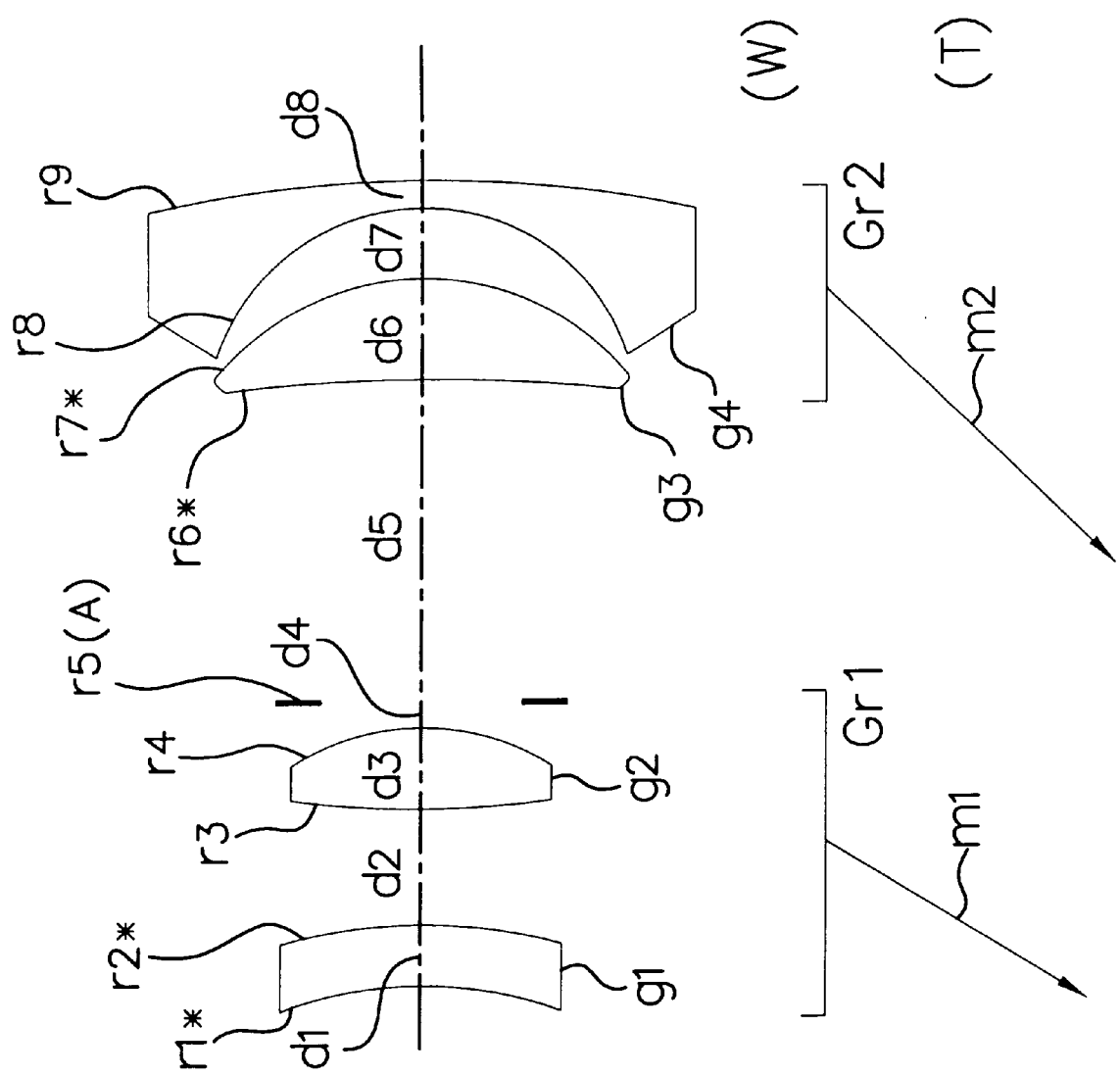
FIG. 4 shows the construction of a fourth embodiment of a zoom lens system.
Figure 5:
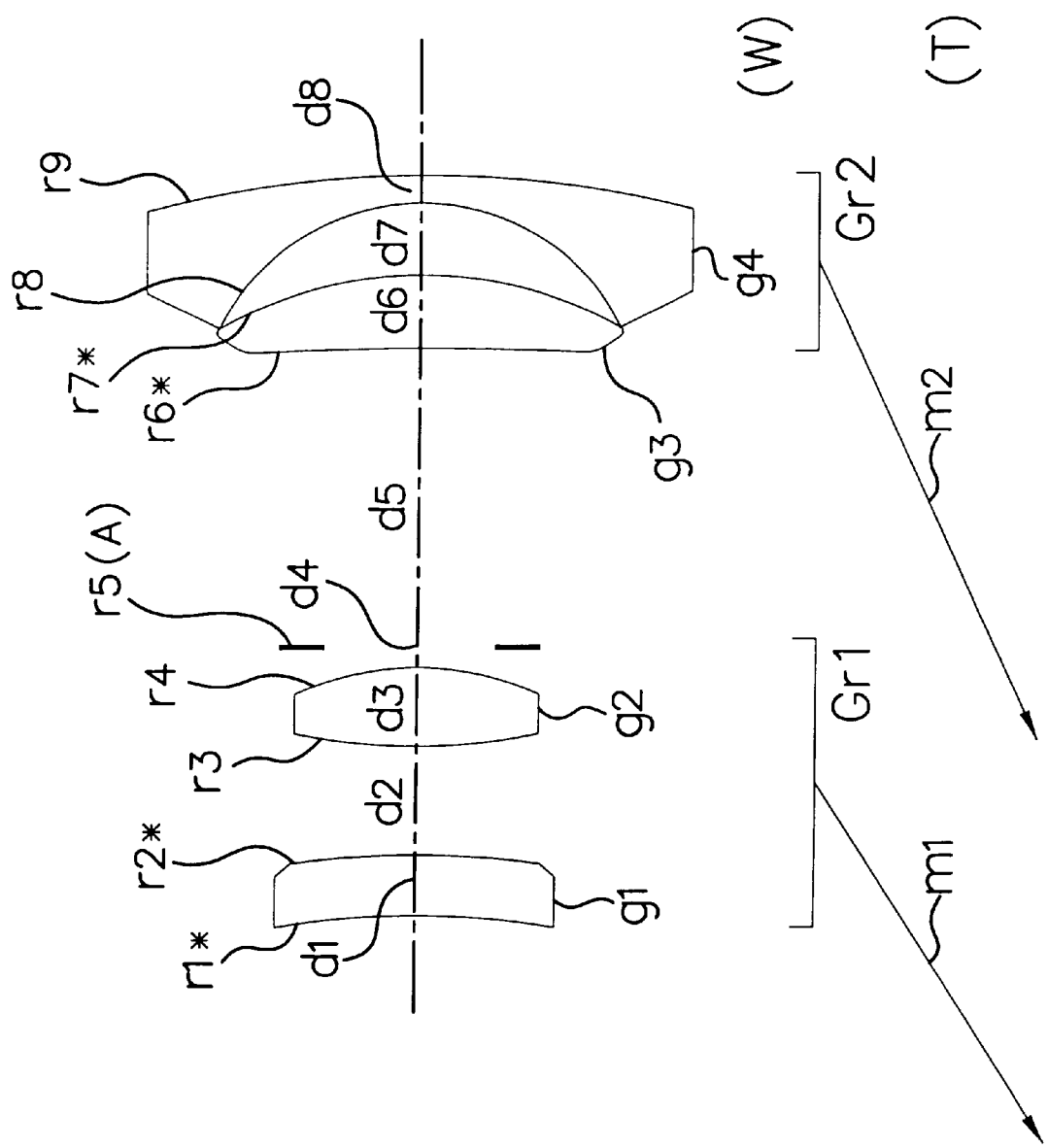
FIG. 5 shows the construction of a fifth embodiment of a zoom lens system.
Figure 6:
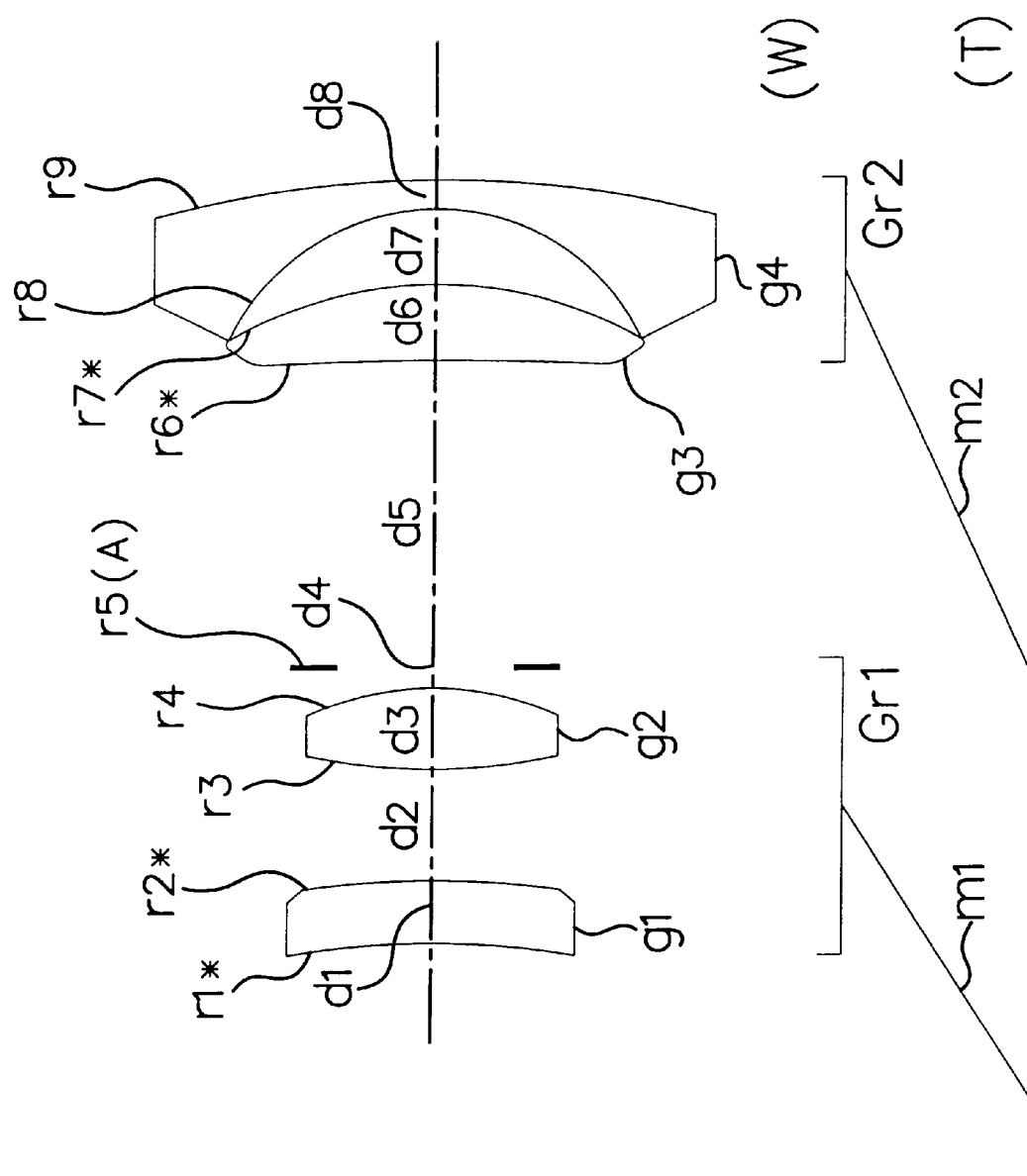
FIG. 6 shows the construction of a sixth embodiment of a zoom lens system.
Figure 7:
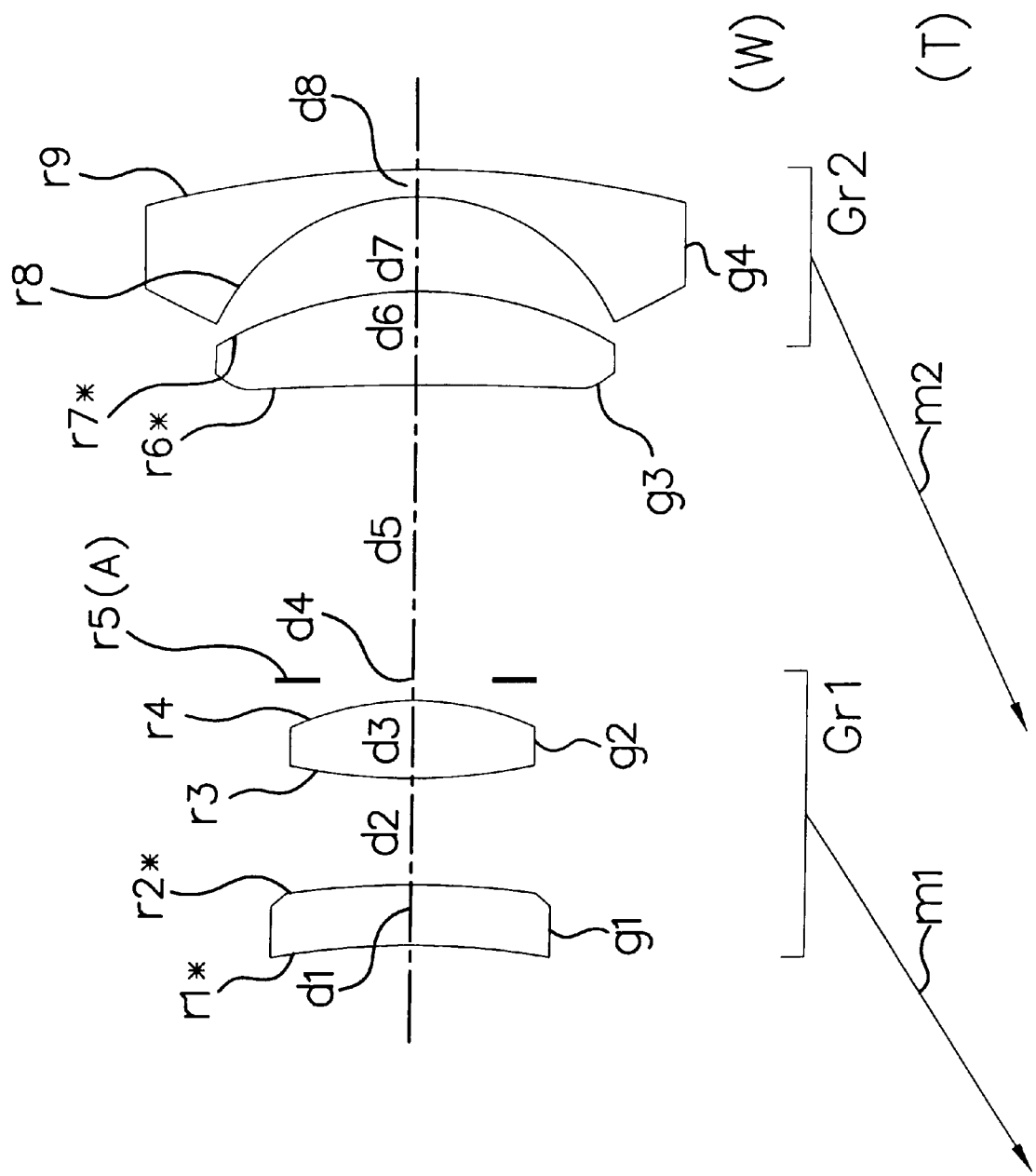
FIG. 7 shows the construction of a seventh embodiment of a zoom lens system.
Figure 8:
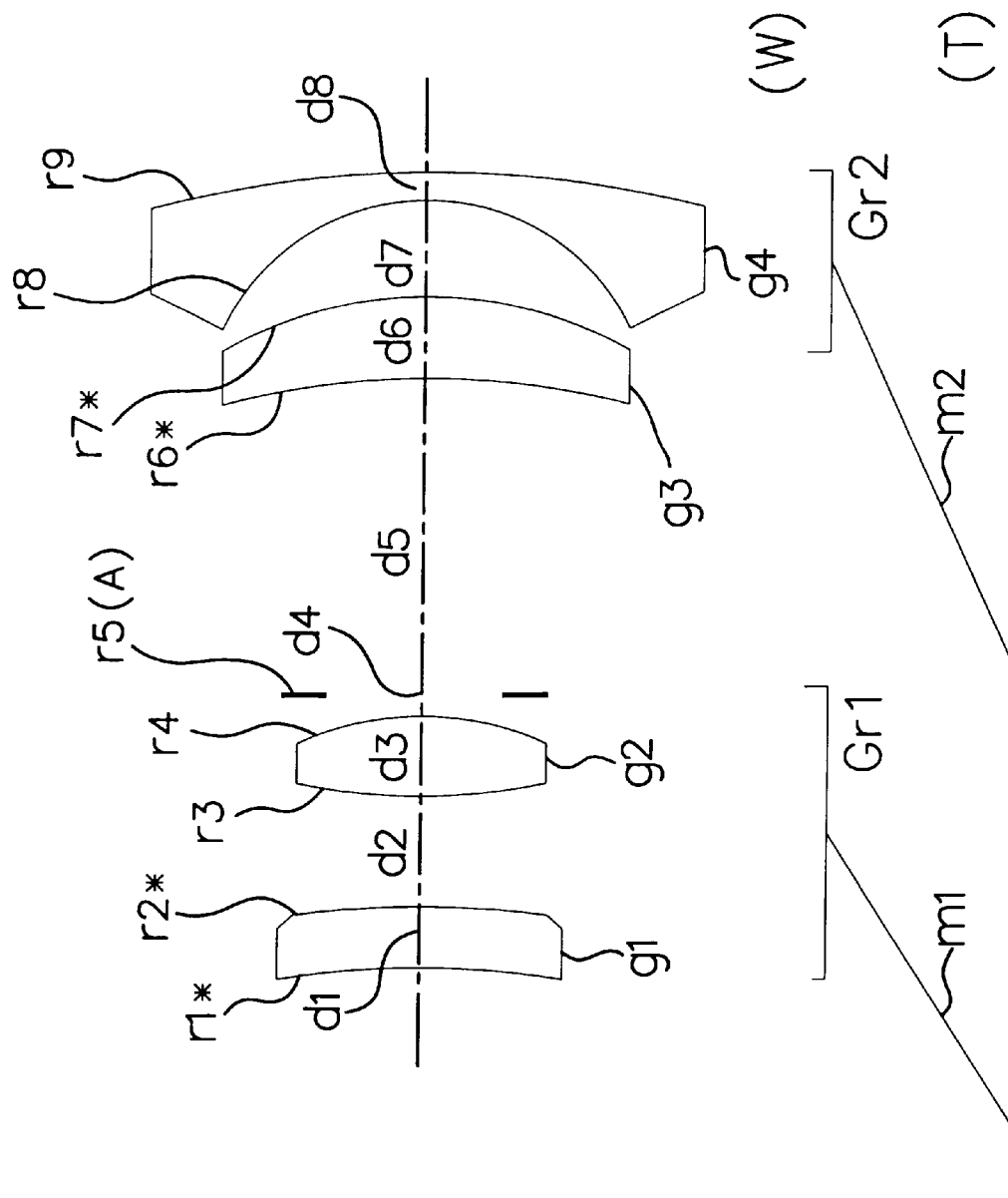
FIG. 8 shows the construction of an eighth embodiment of a zoom lens system.

The preferred embodiments of the zoom lens system of the present invention are described hereinafter with reference to the accompanying drawings. FIGS. 1–8 shows the construction of the lens elements corresponding to the zoom lens systems of the first through eighth embodiments; the lens arrangement shown is set at the shortest focal length [W]. The arrows m1 and m2 in FIGS. 1–8 indicate the movement of first lens unit Gr1 and second lens unit Gr2 when zooming from the shortest focal length [W] to the longest focal length (T).

EMBODIMENTS HAVING A FIRST LENS ELEMENT COMPRISING A THREE-UNIT LENS

The first through third embodiments are zoom lens systems comprising sequentially from the object side a first lens unit Gr1 with positive optical power and second lens unit Gr2 with negative optical power, wherein the distance between said first lens unit Gr1 and said second lens unit Gr2 is reduced via the movement of the two lens units when zooming from the shortest focal length [W] to the longest focal length (T).

In the first embodiment, each unit is constructed sequentially from the object side as described below. The first lens unit Gr1 comprises a negative meniscus lens (bilateral surfaces are aspherical) L1 with a concave surface on the object side, diaphragm A, negative meniscus lens L2 with a concave surface on the object side, and biconvex positive lens L3. The second lens unit Gr2 comprises a positive meniscus lens (bilateral surfaces are aspherical) L1 with a convex surface on the object side, diaphragm A, negative meniscus lens L2 with a convex surface on the object side, and a biconvex positive lens L3.

In the second embodiment, each element is constructed sequentially from the object side as described below. The first lens unit Gr1 comprises a negative meniscus lens (bilateral surfaces are aspherical) L1 with a convex surface on the object side, diaphragm A, negative meniscus lens L2 with a concave surface on the object side, and biconvex positive lens L3. The second lens unit Gr2 comprises a positive meniscus lens (bilateral surfaces are aspherical) with a convex surface on the object side, and a negative meniscus lens with a convex surface on the object side.

In the third embodiment, each unit is constructed sequentially from the object side as described below. The first lens unit Gr1 comprises a negative meniscus lens (bilateral surfaces are aspherical) L1 with a concave surface on the object side, diaphragm A, negative meniscus lens L2 with a concave surface on the object side, and biconvex positive lens L3. The second lens unit Gr2 comprises a positive meniscus lens (bilateral surfaces are aspherical) with a convex surface on the object side, and a negative meniscus lens with a convex surface on the object side.

The first through third embodiments satisfy the conditional equations (1) and (2). The first through third embodiments comprise, sequentially from the object side, a first lens unit Gr1 provided with positive optical power and a second lens unit Gr2 provided with negative optical power, and are moving-type zoom lens systems wherein said first lens unit Gr1 and said second lens unit Gr2 move so as to reduce the spacing therebetween when zooming from the shortest focal length [W] to the longest focal length (T), and which effectively attain a high angle of field in a compact lens system of few elements by satisfying the aforesaid conditional equations (1) and (2).

$$\tan \omega W \geq 0.7 \qquad (1)$$

$$1.25 < \frac{fT}{TLW} \cdot \tan\omega W < 1.5 \qquad (2)$$

where,
  $\omega W$ represents a half angle of view at the shortest focal length condition [W];
  fT represents a focal length of the entire zoom lens system at the longest focal length condition [T]; and
  TLW represents a total length of the entire zoom lens system at the shortest focal length condition (a distance between a summit of the most object side surface of the entire zoom lens system and the image plane).

In a zoom lens system provided with an angle of field of 70 degrees or more at the shortest focal length [W] as shown in conditional equation (1), the zoom lens system can be made more compact while maintaining sufficient performance by satisfying the aforesaid conditional equation (2). When the upper limit of conditional equation (2) is exceeded, aberration correction becomes difficult because the optical power of each lens element becomes very strong. Conversely, when the lower limit of conditional equation (2) is exceeded, the overall length of the lens system becomes excessively large so as to be undesirable from the standpoint of compactness.

In another embodiment of the invention, a wider angle of field can be attained by satisfying the conditional equations (3) and (4) shown below, where $\omega W$, fT and TLW represent the same variables as in the first through third embodiments.

$$\tan \omega W \geq 0.78 \qquad (3)$$

$$1.0 < \frac{fT}{TLW} \cdot \tan\omega W < 1.5 \qquad (4)$$

In a zoom lens system provided with an angle of field of 76 degrees or more at the shortest focal length [W] as shown in conditional equation (3), the zoom lens system can be made more compact while maintaining sufficient performance by satisfying the aforesaid conditional equation (4). When the upper limit of conditional equation (4) is exceeded, aberration correction becomes difficult because the optical power of each lens element becomes very strong. Conversely, when the lower limit of conditional equation (4) is exceeded, the overall length of the lens system becomes excessively large so as to be undesirable from the standpoint of compactness.

In the first through third embodiments, first lens unit Gr1 comprises sequentially from the object side a negative lens L1, diaphragm A, negative lens L2, and positive lens L3. It is therefore desirable that the first lens unit Gr1 comprises sequentially form the object side lens element L1 with negative optical power, diaphragm A, lens element L2 with negative optical power, and lens element L3 with positive optical power.

Conventional two-component positive/negative zoom lens systems typically interpose a diaphragm between the positive and negative lens elements. Therefore, when widening the angle of field, the problem of reduced illumination arises at the image plane edge due to the low exit angle. When the diaphragm A is disposed behind the negative lens unit L1 of first lens element GR1, the reduced illumination at the image plane edge is suppressed because the exit pupil position is on the object side. Accordingly, sufficient illumination can be maintained while increasing the angle of field. Furthermore, the optical power of the lens system can be maintained at the shortest focal length [W] by providing the lens elements L1 and L2 with negative optical power due to the strong retrofocusing of the first lens unit Gr1.

It is desirable that the aforesaid lens elements L1 and L2 provided with negative optical power satisfy conditional equation (5) below.

$$-0.5 < \phi L \times fW < -0.1 \tag{5}$$

where, $\phi L$ represents the optical power of lens elements L1, L2 provided with negative optical power; and fW represents the overall focal length at shortest focal length [W].

Conditional equation (5) stipulates the optical power of negative lens elements L1 and L2. When the upper limit of conditional equation (5) is exceeded, color aberration correction and coma correction become difficult. Conversely, when the lower limit of conditional equation (5) is exceeded, the backfocus of the lens is reduced at the shortest focal length [W], thereby enlarging the optical system.

It is desirable that the lens element L2 provided with negative optical power satisfies conditional equation (6) below.

$$-0.2 < \frac{CR1 - CR2}{CR1 + CR2} < -0.02 \tag{6}$$

where,

CR1 represents a radius of curvature of the most object side surface of said second negative lens sub-unit; and CR2 represents a radius of curvature of the most image side surface of said second negative lens sub-unit.

Conditional equation (6) stipulates the shape of the negative lens element L2. When the upper limit of conditional equation (6) is exceeded, the Petzval sum increases in the negative direction, so as to make correction difficult. Conversely, when the lower limit of the conditional equation (6) is exceeded, the backfocus of the lens is reduced at the shortest focal length [W], thereby enlarging the optical system.

It is desirable that at least one surface of the first lens unit GR1 is an aspherical surface, as in the first through third embodiments. Providing said aspherical surface as the surface nearest the object side of the first lens unit GR1 is particularly effective in maintaining excellent performance. It is further desirable that an aspherical surface disposed nearest the object side of the first lens unit GR1 satisfies the conditional equation (7A) below.

$$0.09 < \phi 1 \cdot (N - N') \cdot \frac{d}{dy} \cdot \{x(y) - x0(y)\} \cdot 1000 < 15 \tag{7A}$$

where, $\phi 1$ represents the optical power of first lens unit GR1;

N represents the refractive index of object side medium of the aspherical surface;

N' represents the refractive index of the image side medium of the aspherical surface;

x(y) represents the surface shape of the aspherical surface; and x0(y) represents the reference spherical surface shape of the aspherical surface.

It is further desirable that the aforesaid conditional equation (7A) is satisfied within a range which satisfies conditional equation (7B) below.

$$0.6 < \frac{y}{y \max} < 1.0 \tag{7B}$$

where, y represents the height in a direction perpendicular to the optical axis; and y max represents the maximum height in a direction perpendicular to the optical axis of the aspherical surface.

The aforesaid values X(y) and X0(y) can be expressed by equations (AS1) and (AS2) below.

$$x(y) = \left(\frac{r}{\varepsilon}\right) \cdot \left\{1 - \sqrt{1 - \varepsilon \cdot \frac{y^2}{r^2}}\right\} + \sum_{i \geq 2} A_i \cdot y^i \tag{AS1}$$

$$x0(y) = r\# \cdot \left\{1 - \sqrt{1 - \varepsilon \cdot \frac{y^2}{r\#^2}}\right\} \tag{AS2}$$

where, r represents the paraxial radius of curvature of the aspherical surface;

$\varepsilon$ represents the two-dimensional curvature parameter;

Ai represents the aspherical surface coefficient of the ith degree; and r# represents the approximate radius of curvature of aspherical surface (i.e., $$\left(\text{i.e.,} \frac{1}{r\#} = \frac{1}{r} + 2 \cdot A2\right).$$

Conditional equation (7A) stipulates the shape of the aspherical surface, and expresses conditions that correct spherical aberration and off-axial light flux flare. Conditional equation (7B) stipulates the range of the aspherical surface. When the upper limit of conditional equation (7A) is exceeded, there is a pronounced tendency of the spherical aberration to fall on the underside in the full zoom range, and marked occurrence of off-axial light flux flare. When the lower limit of conditional equation (7A) is exceeded, aspherical aberration falls on the over side in the full zoom range, and there is a marked tendency to over correct off-axial light flux flare.

When a lens element having the aforesaid aspherical surface is used as a double aspherical surface lens element, there is excellent balance between spherical aberration correction and off-axial flare correction, as in the first through third embodiments. That is, inadequate correction of spherical aberration and off-axial flare by one aspherical surface can be corrected by the other aspherical surface.

In the aforesaid double aspherical surface lens element, it is desirable that the aspherical surface nearest the object side of the first lens unit GR1 satisfies the aforesaid conditional equation (7A) (and preferably satisfies the conditional equation (7B)), and the aspherical surface nearest the image side of said first lens unit GR1 satisfies the conditional equation (8A) below. It is further desirable that the aforesaid conditional equation (8A) is satisfied within a range which satisfies the conditional equation (8B) below, as in the aforesaid conditional equation (7A).

$$-30 < \phi 1 \cdot (N - N') \cdot \frac{d}{dy} \cdot \{x(y) - x0(y)\} \cdot 1000 < -0.1 \quad (8A)$$

$$0.6 < \frac{y}{y\,\max} < 1.0 \quad (8B)$$

Conditional equation (8A) stipulates the shape of the aspherical surface similar to conditional equation (7A), and conditional equation (8B) stipulates the range of the aspherical surface similar to conditional equation (7B). When the upper limit of conditional equation (8A) is exceeded, spherical aberration and off-axial flare are inadequately corrected, whereas when the lower limit of conditional equation (8A) is exceeded, spherical aberration and off-axial flare are over-corrected.

EMBODIMENTS HAVING A FIRST LENS UNIT COMPRISING A TWO-ELEMENT LENS

The fourth through eighth embodiments (FIGS. 4–8) are zoom lens systems comprising sequentially from the object side a first lens unit Gr1 with positive optical power and second lens element Gr2 with negative optical power, wherein the distance (d5) between said first lens unit Gr1 and said second lens unit Gr2 is reduced via the movement of the two lens elements when zooming from the shortest focal length [W] to the longest focal length (T).

In the fourth through eighth embodiments, the various lens elements are constructed as described below sequentially from the object side. The first lens element GR1 comprises a negative meniscus lens (bilateral surfaces are aspherical) g1 with a concave surface on the object side, biconvex positive lens g2, and diaphragm A. The second lens unit GR2 comprises a positive meniscus lens element (bilateral surfaces are aspherical) g3 with a convex surface on the object side, and negative meniscus lens element g3 with a convex surface on the image side.

The mode of the fourth through eighth embodiments provides a first lens element GR1 comprising sequentially from the object side two-element lens elements of a first lens element g1 with negative optical power, second lens element g2 with positive optical power, and a diaphragm A, and second lens unit GR2 comprising sequentially from the object side two-element lens elements of a third lens element g3 with positive optical power, and fourth lens element g4 with negative optical power. These lens units GR1 and GR2 are provided with lens element g1 and g3 which have aspherical surfaces on the object side.

The fourth through eighth embodiments satisfy conditional equations (9) and (10) below.

$$0.3 < \frac{T12}{TL} < 1.3 \quad (9)$$

$$1.1 < \frac{fW}{Y'} < 1.3 \quad (10)$$

where,
T12 represents a thickness (d3) of said second positive lens sub-unit of said first lens unit in the optical axis direction;
TL represents a distance of the air space between said first negative and second positive lens sub-units in the optical axis direction;
fW represents a focal length of the entire zoom lens system in the shortest focal length condition; and
Y' represents a half diagonal distance of an image.

In order to make a compact zoom lens system with two positive/negative lens elements, the optical power of each said lens element must be increased. When the optical power of each lens element is increased, it is generally necessary to use methods such as increasing the number of lens elements due to the difficulty of correcting off-axial color aberration. Conditional equation (1) which stipulates the ratio between the on-axis open space (d2) of negative lens unit g1 and positive lens element gr in first lens element GR1 and the on-axis thickness (d3) of positive lens element g2, and the conditional equation (2) which stipulates the ratio of image plane diagonal length and the focal length at the shortest focal length [W] are conditional equations providing excellent correction of off-axial color aberration. The paraxial equation of the off-axial color aberration coefficient is shown in equation (a) below.

$$Ti = \frac{\phi i}{vi} \times hi \times hi' \quad (a)$$

where,
Ti represents the off-axial color aberration coefficient;
$\phi i$ represents the optical power of lens no. i from the object side;
vi represents the Abbe number of lens no. i from the object side;
hi represents the entrance height of axial light rays; and
hi' represents the entrance height of main light rays.

According to conditional equation (a), the off-axial color aberration coefficient Ti is determined by the entrance height of light rays on the surface if the optical power and Abbe number of the lens does not change. Accordingly, when the upper limit of conditional equation (9) is exceeded, the open space ratio between the negative lens element g1 and the positive lens element g2 is reduced and there is an increase in off-axial incidence light, such that the off-axial color aberration coefficient TI is increased to the negative side, thereby making correction of said color aberration difficult. Conversely, when the lower limit of conditional equation (9) is exceeded, the open space ratio between negative lens element g1 and positive lens element g2 is increased so as to excessively increase the total thickness of the first lens unit GR1, which is disadvantageous from the standpoint of compactness.

When the lower limit of conditional equation (10) is exceeded, the maximum incidence angle is increased so as to make off-axial color aberration correction difficult. Conversely, when the upper limit of conditional equation (10) is exceeded, an extremely strong telephoto-type lens is required at the longest focal length (T) to realize a compact zoom lens system at high magnification. In this instance, it is difficult to achieve superior distortion correction to the high optical power of the various lens element.

It is desirable that the surface (i.e., surface r1) nearest the object side of the first lens unit GR1 is a concave surface on the object side, as in the fourth through eighth embodiments. Providing a concave surface on the object side surface of the first lens unit GR1 strengthens the retrofocus of the first lens unit GR1, and maintains the backfocus of the lens at the shortest focal length [W]. Therefore, the exterior diameter of the second lens unit GR2 can be reduced to provide a camera of a more compact form factor.

It is desirable that the first lens element g1 provided with a concave surface nearest the object side satisfies the conditional equation (11) below.

$$-0.25 < \frac{CR1 - CR2}{CR1 + CR2} < -0.1 \quad (11)$$

where,
   CR1 represents the radius of curvature of the surface nearest the object side of negative lens element g1 (=r1); and
   CR2 represents the radius of curvature of the surface nearest the image side (=r2).

Conditional equation (11) stipulates the shape of the first lens element g1 with negative optical power. When the upper limit of conditional equation (11) is exceeded, the retrofocus of the first lens element GR1 is reduced, so as to make it difficult to maintain adequate backfocus of the lens at the shortest focal length [W]. Conversely, when the lower limit of conditional equation (11) is exceeded, it becomes difficult to correct off-axial coma.

The seventh and eighth embodiments satisfy the conditional equations (12)~(14).

$$0.055 < \frac{Np}{vp} < 0.07 \quad (12)$$

$$0.035 < \frac{Nn}{vn} < 0.05 \quad (13)$$

$$1.5 < Np < 1.65 \quad (14)$$

where,
   Np represents a refractive index of the positive lens element of the second lens unit relative to d-line;
   vp represents Abbe number of the positive lens element of the second lens unit;
   Nn represents a refractive index of the negative lens element of the second lens unit relative to d-line; and
   vn represents Abbe number of the negative lens element.

As previously described, the optical power of each lens element must be increased to have a compact zoom lens system comprising both positive and negative lens elements. Glass having high refraction and low dispersion is generally used as the negative lens unit g4 of second lens element GR2 so as to provide sufficient correction of aberration in said second lens unit GR2. Although many high refraction/low dispersion materials have been developed in recent years, they are typically expensive. Therefore, in the seventh and eighth embodiments, the negative lens element g4 in second lens unit GR2 is a refraction/dispersion lens in a relatively inexpensive range while maintaining excellent dispersion correction via suitable glass arrangement.

Conditional equations (12) and (13) which stipulate the ratio of refraction and dispersion of the positive and negative lens element g3 and g4 in second lens unit GR2, and the conditional equation (14) which sets a suitable refraction for the negative lens element g4 in second lens unit GR2 are conditional equations which effectively correct color aberration and image plane performance by the aforesaid suitable glass placement. The Petzval sum expressing image plane performance is defined by equation (b) below.

$$P = \sum \frac{\phi i}{Ni} \quad (b)$$

where,
   P represents the Petzval sum of the overall system;
   $\phi i$ represents the optical power of lens no. i from the object side; and
   Ni represents the refractive index of lens no. i from the object side.

When the upper limit of conditional equation (12) is exceeded, there is over correction of color aberration within second lens unit GR2 when the dispersion value increases, and image plane performance deteriorates due to an increase of the Petzval sum on the negative side via equation (b) when the refractive index increases. Conversely, when the lower limit of conditional equation (12) is exceeded, there is insufficient correction of color aberration in second lens element GR2 when the dispersion value decreases, and image plane performance deteriorates due to an increase of the Petzval sum on the positive side via equation (b) when the refractive index decreases.

When the upper limit of conditional equation (13) is exceeded, there is insufficient correction of color aberration in the second lens unit GR2 when the dispersion value increases, and image plane performance deteriorates due to the increase of the Petzval sum on the positive side via equation (b) when the refractive index increases. Conversely, when the lower limit of conditional equation (13) is exceeded, there is over correction of color aberration in second lens unit GR2 when the dispersion value decreases, and image plane performance deteriorates due to the increase of the Petzval sum on the negative side via equation (b) when the refractive index decreases.

When the upper limit of conditional equation (14) is exceeded, image plane performance deteriorates due to the increase of the Petzval sum on the negative side. Conversely, when the lower limit of conditional equation (14) is exceeded, image plane performance deteriorates due to the increase of the Petzval sum on the positive side.

The various lens elements need not necessarily be constructed only of refractive type lens elements which deflect incidence rays by refraction, and may include diffractive lens element which deflect incidence rays by diffraction, hybrid lens elements which deflect incidence rays by a combination of diffraction and refraction.

EXAMPLES OF NUMERICAL VALUES

The construction of the zoom lens system of the present invention is described hereinafter by way of specific examples of construction data and aberration diagrams. In the construction data Tables 1~8 of the various embodiments, the value ri (i=1, 2, 3, . . . ) is the radius of curvature of the number i surface counting from the object side, the value di (i=1,2,3, . . . ) is the axial distance of the no. i surface counting from the object side, Ni (i=1, 2, 3, . . . ) and vi (i=1, 2, 3, . . . ) are respectively the refractive index (Nd and Abbe number (vd) relative to line d of lens no. i counting from the object side. The axial distance (variable distance) that changes when zooming and shown in Tables 1~8 is the axial distance between lens elements at the shortest focal length (short focal length end) [W]-to-middle focal length (intermediate focal length) (M)-to-longest focal length (longest focal length end) (T). The total focal length f and F number FNO relative to each focal length [W], (M), (T) are combined. In the first through third embodiments, the values of conditional equations (7A0, (7B), (8A), and (8B) are combined. the values of conditional equations (1)~(6) of the first through third embodiments are shown in Table 9, and the values of conditional equations (9)~(14) of the fourth through eighth embodiments are shown in Table 10.

The surfaces marked by an asterisk symbol (*) at radius of curvature ri indicate aspherical surfaces, and are defined by aforesaid equation (AS1) which expresses the shape of the aspherical surface.

Figure 9A:
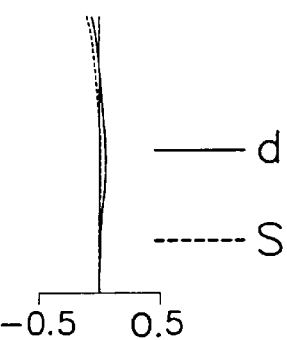
FIGS. 9a~9i show aberration curves of the first embodiment.
Figure 9B:
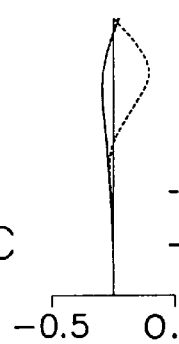
Figure 9C:
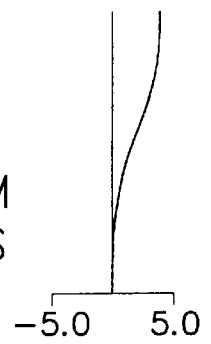
Figure 9D:
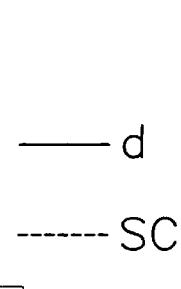
Figure 9E:
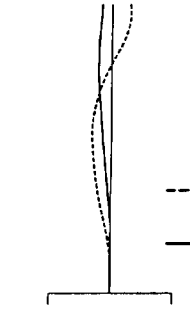
Figure 9F:
Figure 9G:
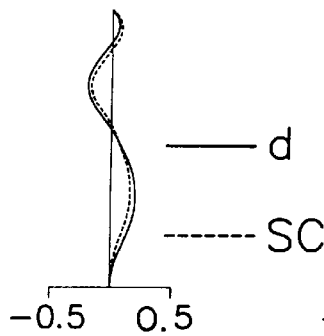
Figure 9H:
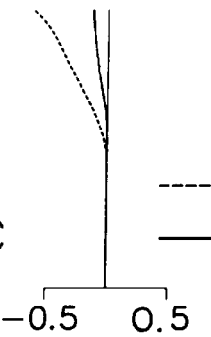
Figure 9I:
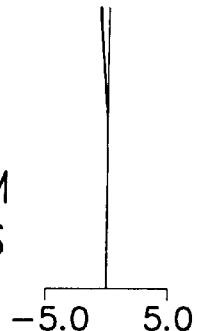

FIGS. 9A~9i and 16A~16i represent aberration curves of the first through eighth embodiments. In these drawings, the drawings marked with "a" show the spherical aberration and sine condition of the shortest focal length state, the drawings marked with "d" show the intermediate focal length state, and the drawings with "q" show the longest focal length state. The solid line (d) represents spherical aberration relative to lined, and dashed line (SC) represents an insufficiency of the sine condition. The drawings marked with "b" express the amount of astigmatism at the shortest focal length, drawings marked with "e" express the amount of astigmatism at the intermediate focal length, and drawing marked "h" shows astigmatism at the longest focal length. The dashed line (DM) and solid line (DS) respectively express the astigmatism relative to line d at the meridional plane and sagittal plane. Drawings marked with "c" express the amount of distortion (%) at the shortest focal length, drawings marked with "f" express distortion at the intermediate focal length, and drawings marked with "i" express distortion at the longest focal length.

As previously described, the present invention provides a compact form factor with excellent aberration correction by satisfying predetermined conditional equations. The present invention further provides a compact form factor while maintaining illumination at the edges of the image plane at wide angle of field. Accordingly, a compact zoom lens system having few lens elements can be realized with an angle of field of about 80 degree at the shortest focal length.

The present invention provides an optical system of compact form factor while maintaining high optical performance by stipulating the shape of the negative lens elements on the image side in a first lens element. High optical performance is attained due to excellent correction of spherical aberration and off-axial light flux flare by providing an aspherical surface in a first lens element.

A zoom lens system having a zoom ratio of 2× to 3× in a compact form factor with few lens elements achieves excellent aberration correction by providing a suitable ratio between the center thickness of the positive lens of a first lens element and spacing between negative and positive lens elements. The present invention achieves a zoom ratio of 2× to 3× in a compact form factor with few lens elements and excellent aberration correction by providing a suitable glass arrangement of lenses comprising two lens elements.

The zoom lens system of the present invention as described above has a compact form factor so as to allow more compact design of cameras using said zoom lens system. Since the present invention provides high magnification in a compact form factor, it is suitable for use as a photographic lens in lens shutter cameras.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

TABLE 1

Embodiment 1

$f = 20.6 \sim 31.6 \sim 48.8$  $FNO = 5.82 \sim 6.20 \sim 8.40$

| Radius of Curvature | Axial Distance | Refractive Index | Abbe Number |
|---|---|---|---|
| r1* = −16.284 | | | |
| | d1 = 1.500 | N1 = 1.84506 | ν1 = 23.66 |
| r2* = −20.286 | | | |
| | d2 = 1.300 | | |
| r3 = ∞(Diaphragm) | | | |
| | d3 = 1.300 | | |
| r4 = −9.843 | | | |
| | d4 = 1.000 | N2 = 1.80518 | ν2 = 25.43 |
| r5 = −11.404 | | | |
| | d5 = 0.100 | | |
| r6 = 460.653 | | | |
| | d6 = 2.600 | N3 = 1.48749 | ν3 = 70.44 |
| r7 = −7.196 | | | |
| | d7 = 8.676 ~ 3.988 ~ 0.900 | | |
| r8* = −43.708 | | | |
| | d8 = 2.781 | N4 = 1.52510 | ν4 = 56.38 |
| r9* = −19.589 | | | |
| | d9 = 3.682 | | |
| r10 = −7.966 | | | |
| | d10 = 0.800 | N5 = 1.75700 | ν5 = 47.71 |
| r11 = −41.249 | | | |

Aspherical Coefficient r1:ε = 1.0000
A4 = 0.34162 × 10$^{-3}$
A6 = 0.56114 × 10$^{-4}$
A8 = −0.75287 × 10$^{-5}$
A10 = 0.65612 × 10$^{-6}$
A12 = −0.21864 × 10$^{-7}$
r2:ε = 1.0000
A4 = 0.83236 × 10$^{-3}$
A6 = 0.20870 × 10$^{-4}$
A8 = −0.74283 × 10$^{-7}$
A10 = 0.13988 × 10$^{-6}$
A12 = −0.62795 × 10$^{-8}$
r8:ε = 1.0000
A4 = 0.19503 × 10$^{-3}$
A6 = −0.13875 × 10$^{-4}$
A8 = 0.12823 × 10$^{-5}$
A10 = −0.45437 × 10$^{-7}$
A12 = 0.73124 × 10$^{-9}$
A14 = −0.42684 × 10$^{-11}$
r9:ε = 1.0000
A4 = 0.30932 × 10$^{-4}$
A6 = −0.69574 × 10$^{-5}$
A8 = 0.43539 × 10$^{-6}$
A10 = −0.74512 × 10$^{-8}$
A12 = −0.15843 × 10$^{-10}$
A14 = 0.98606 × 10$^{-12}$ The Value of the Conditions (7A), (7B); (8A), (8B)

r1:

y/ymax = 0.1 . . . 0.00210067
y/ymax = 0.2 . . . 0.0176982
y/ymax = 0.3 . . . 0.0647533
y/ymax = 0.4 . . . 0.167319
y/ymax = 0.5 . . . 0.353648
y/ymax = 0.6 . . . 0.653992
y/ymax = 0.7 . . . 1.10285
y/ymax = 0.8 . . . 1.74787
y/ymax = 0.9 . . . 2.65588
y/ymax = 1.0 . . . 3.87931 r2:

y/ymax = 0.1 . . . −0.00467400
y/ymax = 0.2 . . . −0.0379172
y/ymax = 0.3 . . . −0.130032

TABLE 1-continued

Embodiment 1 f = 20.6 ~ 31.6 ~ 48.8    FNO = 5.82 ~ 6.20 ~ 8.40 y/ymax = 0.4 . . . −0.315469
y/ymax = 0.5 . . . −0.635244
y/ymax = 0.6 . . . −1.14161
y/ymax = 0.7 . . . −1.90505
y/ymax = 0.8 . . . −3.02434
y/ymax = 0.9 . . . −4.63493
y/ymax = 1.0 . . . −6.90623

TABLE 2

Embodiment 2 f = 20.6 ~ 31.6 ~ 48.7    FNO = 5.75 ~ 6.50 ~ 8.04

| Radius of Curvature | Axial Distance | Refractive Index | Abbe Number |
|---|---|---|---|
| r1* = −189.296 | | | |
| | d1 = 1.400 | N1 = 1.84506 | ν1 = 23.66 |
| r2* = 122.975 | | | |
| | d2 = 2.000 | | |
| r3 = ∞(Diaphragm) | | | |
| | d3 = 1.500 | | |
| r4 = −10.000 | | | |
| | d4 = 1.082 | N2 = 1.80518 | ν2 = 25.43 |
| r5 = −11.639 | | | |
| | d5 = 0.100 | | |
| r6 = 217.658 | | | |
| | d6 = 2.600 | N3 = 1.48749 | ν3 = 70.44 |
| r7* = −6.585 | | | |
| | d7 = 7.266 ~ 3.428 ~ 0.900 | | |
| r8* = −37.340 | | | |
| | d8 = 2.500 | N4 = 1.52510 | ν4 = 56.38 |
| r9* = −20.603 | | | |
| | d9 = 3.639 | | |
| r10 = −7.727 | | | |
| | d10 = 0.800 | N5 = 1.75700 | ν5 = 47.71 |
| r11 = −42.292 | | | |

Aspherical Coefficient r1:ε =  1.0000
A4 =  0.65539 × 10$^{-3}$
A6 =  0.13443 × 10$^{-4}$
A8 = −0.11851 × 10$^{-5}$
A10 =  0.14391 × 10$^{-6}$
A12 = −0.61735 × 10$^{-8}$
r2:ε =  1.0000
A4 =  0.11815 × 10$^{-2}$
A6 =  0.19538 × 10$^{-4}$
A8 =  0.11506 × 10$^{-5}$
A10 =  0.49642 × 10$^{-7}$
A12 = −0.36184 × 10$^{-8}$
r7:ε =  1.0000
A4 =  0.18176 × 10$^{-3}$
A6 =  0.10038 × 10$^{-5}$
A8 = −0.50882 × 10$^{-6}$
A10 =  0.63615 × 10$^{-7}$
A12 = −0.20430 × 10$^{-8}$
r8:ε =  1.0000
A4 =  0.12704 × 10$^{-3}$
A6 = −0.35933 × 10$^{-5}$
A8 =  0.77203 × 10$^{-6}$
A10 = −0.35793 × 10$^{-7}$
A12 =  0.65063 × 10$^{-9}$
A14 = −0.40251 × 10$^{-11}$
r9:ε =  1.0000
A4 = −0.98152 × 10$^{-4}$
A6 = −0.11394 × 10$^{-6}$
A8 =  0.39404 × 10$^{-6}$

TABLE 2-continued

Embodiment 2 f = 20.6 ~ 31.6 ~ 48.7    FNO = 5.75 ~ 6.50 ~ 8.04

A10 = −0.16456 × 10$^{-7}$
A12 =  0.21391 × 10$^{-9}$
A14 = −0.78179 × 10$^{-12}$

The Value of conditions (7A), (7B); (8A), (8B)

r1:

y/ymax = 0.1 . . .  0.00419016
y/ymax = 0.2 . . .  0.0337478
y/ymax = 0.3 . . .  0.115229
y/ymax = 0.4 . . .  0.277400
y/ymax = 0.5 . . .  0.551402
y/ymax = 0.6 . . .  0.972060
y/ymax = 0.7 . . .  1.57958
y/ymax = 0.8 . . .  2.42236
y/ymax = 0.9 . . .  3.55461
y/ymax = 1.0 . . .  5.01545 r2:

y/ymax = 0.1 . . . −0.00719122
y/ymax = 0.2 . . . −0.0577562
y/ymax = 0.3 . . . −0.197221
y/ymax = 0.4 . . . −0.475979
y/ymax = 0.5 . . . −0.953261
y/ymax = 0.6 . . . −1.70353
y/ymax = 0.7 . . . −2.82530
y/ymax = 0.8 . . . −4.45182
y/ymax = 0.9 . . . −6.76037
y/ymax = 1.0 . . . −9.97025

TABLE 3

Embodiment 3 f = 20.6 ~ 28.3 ~ 39.0    FNO = 5.64 ~ 6.20 ~ 7.09

| Radius of Curvature | Axial Distance | Refractive Index | Abbe Number |
|---|---|---|---|
| r1* = −15.057 | | | |
| | d1 = 1.400 | N1 = 1.84506 | ν1 = 23.66 |
| r2* = −18.598 | | | |
| | d2 = 1.600 | | |
| r3 = ∞(Diaphragm) | | | |
| | d3 = 1.500 | | |
| r4 = −16.290 | | | |
| | d4 = 1.000 | N2 = 1.80518 | ν2 = 25.43 |
| r5 = −19.967 | | | |
| | d5 = 0.100 | | |
| r6 = 53.611 | | | |
| | d6 = 2.600 | N3 = 1.48749 | ν3 = 70.44 |
| r7 = −7.324 | | | |
| | d7 = 6.272 ~ 3.343 ~ 1.193 | | |
| r8* = −79.385 | | | |
| | d8 = 2.500 | N4 = 1.52510 | ν4 = 56.38 |
| r9* = −35.666 | | | |
| | d9 = 4.296 | | |
| r10 = −7.050 | | | |
| | d10 = 0.800 | N5 = 1.75700 | ν5 = 47.71 |
| r11 = −26.144 | | | |

Aspherical Coefficient r1:ε =  1.0000
A4 =  0.43712 × 10$^{-3}$
A6 =  0.62339 × 10$^{-4}$
A8 = −0.83672 × 10$^{-5}$
A10 =  0.76826 × 10$^{-6}$
A12 = −0.27472 × 10$^{-7}$

TABLE 3-continued

Embodiment 3 f = 20.6 ~ 28.3 ~ 39.0    FNO = 5.64 ~ 6.20 ~ 7.09 r2: $\epsilon$ = 1.0000
A4 = 0.93935 × $10^{-3}$
A6 = 0.15469 × $10^{-4}$
A8 = 0.88057 × $10^{-6}$
A10 = 0.12334 × $10^{-6}$
A12 = −0.99052 × $10^{-8}$ r8: $\epsilon$ = 1.0000
A4 = 0.24954 × $10^{-3}$
A6 = −0.15610 × $10^{-4}$
A8 = 0.12143 × $10^{-5}$
A10 = −0.45018 × $10^{-7}$
A12 = 0.77937 × $10^{-9}$
A14 = −0.45239 × $10^{-11}$ r9: $\epsilon$ = 1.0000
A4 = 0.65530 × $10^{-4}$
A6 = −0.58020 × $10^{-5}$
A8 = 0.27587 × $10^{-6}$
A10 = −0.63112 × $10^{-8}$
A12 = −0.48824 × $10^{-11}$
A14 = 0.10643 × $10^{-11}$

The Value of the Conditions (7A), (7B); (8A), (8B)

r1:

y/ymax = 0.1 ... 0.00313040
y/ymax = 0.2 ... 0.00265800
y/ymax = 0.3 ... 0.00967010
y/ymax = 0.4 ... 0.0248099
y/ymax = 0.5 ... 0.0521297
y/ymax = 0.6 ... 0.0960635
y/ymax = 0.7 ... 0.161967
y/ymax = 0.8 ... 0.257211
y/ymax = 0.9 ... 0.390310
y/ymax = 1.0 ... 0.559864 r2:

y/ymax = 0.1 ... −0.000751296
y/ymax = 0.2 ... −0.00606160
y/ymax = 0.3 ... −0.0207517
y/ymax = 0.4 ... −0.0503027
y/ymax = 0.5 ... −0.101527
y/ymax = 0.6 ... −0.183641
y/ymax = 0.7 ... −0.309534
y/ymax = 0.8 ... −0.496004
y/ymax = 0.9 ... −0.759322
y/ymax = 1.0 ... −1.09868

TABLE 4

Embodiment 4 f = 25.6 ~ 40.0 ~ 72.8    FNO = 5.85 ~ 6.50 ~ 10.02

| Radius of Curvature | Axial Distance | Refractive Index | Abbe Number |
|---|---|---|---|
| r1* = −17.025 | | | |
| | d1 = 2.041 | N1 = 1.84506 | ν1 = 23.66 |
| r2* = −24.258 | | | |
| | d2 = 4.500 | | |
| r3 = 41.778 | | | |
| | d3 = 3.000 | N2 = 1.48749 | ν2 = 70.44 |
| r4 = −11.134 | | | |
| | d4 = 1.100 | | |
| r5 = ∞(Diaphragm) | | | |
| | d5 = 12.011 ~ 6.428 ~ 1.961 | | |
| r6* = −49.804 | | | |
| | d6 = 3.350 | N3 = 1.52510 | ν3 = 56.38 |

TABLE 4-continued

Embodiment 4 f = 25.6 ~ 40.0 ~ 72.8    FNO = 5.85 ~ 6.50 ~ 10.02

| | | | |
|---|---|---|---|
| r7* = −15.556 | | | |
| | d7 = 2.800 | | |
| r8 = −8.615 | | | |
| | d8 = 0.800 | N4 = 1.77250 | ν4 = 49.62 |
| r9 = −75.030 | | | |

Aspherical Coefficient r1:

$\epsilon$ = −0.10763 × $10^2$
A4 = −0.30885 × $10^{-3}$
A6 = 0.10508 × $10^{-4}$
A8 = −0.25631 × $10^{-6}$
A10 = 0.78216 × $10^{-8}$
A12 = −0.11942 × $10^{-9}$ r2:

$\epsilon$ = 0.19103
A4 = 0.12722 × $10^{-3}$
A6 = 0.36466 × $10^{-5}$
A8 = 0.14841 × $10^{-8}$
A10 = 0.33726 × $10^{-8}$
A12 = −0.89996 × $10^{-10}$ r6:

$\epsilon$ = 0.39444 × $10^2$
A4 = 0.11423 × $10^{-3}$
A6 = −0.33689 × $10^{-5}$
A8 = 0.18268 × $10^{-6}$
A10 = −0.36235 × $10^{-8}$
A12 = 0.22505 × $10^{-10}$
A14 = −0.44210 × $10^{-14}$ r7:

$\epsilon$ = 0.24060 × 10
A4 = −0.21402 × $10^{-4}$
A6 = 0.19459 × $10^{-5}$
A8 = −0.15108 × $10^{-6}$
A10 = 0.33206 × $10^{-8}$
A12 = −0.26933 × $10^{-10}$
A14 = −0.94394 × $10^{-13}$

TABLE 5

Embodiment 5 f = 24.6 ~ 40.0 ~ 68.2    FNO = 5.74 ~ 7.16 ~ 10.17

| Radius of Curvature | Axial Distance | Refractive Index | Abbe Number |
|---|---|---|---|
| r1* = −19.304 | | | |
| | d1 = 2.000 | N1 = 1.84506 | ν1 = 23.66 |
| r2* = −29.139 | | | |
| | d2 = 4.369 | | |
| r3 = 53.726 | | | |
| | d3 = 2.900 | N2 = 1.48749 | ν2 = 70.44 |
| r4 = −10.053 | | | |
| | d4 = 1.000 | | |
| r5 = ∞(Diaphragm) | | | |
| | d5 = 11.505 ~ 5.757 ~ 1.960 | | |
| r6* = −79.446 | | | |
| | d6 = 2.900 | N3 = 1.52510 | ν3 = 56.38 |
| r7* = −19.848 | | | |
| | d7 = 3.000 | | |
| r8 = −8.810 | | | |
| | d8 = 0.800 | N4 = 1.77250 | ν4 = 49.62 |
| r9 = −79.956 | | | |

TABLE 5-continued

Embodiment 5

$f = 24.6 \sim 40.0 \sim 68.2$    $FNO = 5.74 \sim 7.16 \sim 10.17$

Aspherical Coefficient r1:

$\epsilon = 1.0000$
$A4 = -0.32877 \times 10^{-4}$
$A6 = 0.99746 \times 10^{-5}$
$A8 = -0.37907 \times 10^{-6}$
$A10 = 0.10436 \times 10^{-7}$
$A12 = -0.11950 \times 10^{-9}$ r2:

$\epsilon = 1.0000$
$A4 = 0.15894 \times 10^{-3}$
$A6 = 0.61193 \times 10^{-5}$
$A8 = 0.12874 \times 10^{-6}$
$A10 = -0.10626 \times 10^{-7}$
$A12 = 0.26255 \times 10^{-9}$ r6:

$\epsilon = 1.0000$
$A4 = 0.13642 \times 10^{-3}$
$A6 = -0.67926 \times 10^{-5}$
$A8 = 0.72347 \times 10^{-6}$
$A10 = -0.28886 \times 10^{-7}$
$A12 = 0.48278 \times 10^{-9}$
$A14 = -0.27461 \times 10^{-11}$ r7:

$\epsilon = 1.0000$
$A4 = -0.23682 \times 10^{-4}$
$A6 = 0.25515 \times 10^{-5}$
$A8 = -0.99089 \times 10^{-7}$
$A10 = 0.44368 \times 10^{-8}$
$A12 = -0.14849 \times 10^{-9}$
$A14 = 0.15762 \times 10^{-11}$

TABLE 6

Embodiment 6

$f = 25.6 \sim 40.0 \sim 72.9$    $FNO = 5.84 \sim 7.41 \sim 10.01$

| Radius of Curvature | Axial Distance | Refractive Index | Abbe Number |
|---|---|---|---|
| r1* = −17.109 | | | |
| | d1 = 1.700 | N1 = 1.84506 | ν1 = 23.66 |
| r2* = −24.144 | | | |
| | d2 = 3.200 | | |
| r3 = 198.910 | | | |
| | d3 = 2.930 | N2 = 1.48749 | ν2 = 70.44 |
| r4 = −8.981 | | | |
| | d4 = 1.000 | | |
| r5 = ∞(Diaphragm) | | | |
| | d5 = 11.540 ~ 6.225 ~ 1.960 | | |
| r6* = −54.426 | | | |
| | d6 = 2.700 | N3 = 1.58340 | ν3 = 30.23 |
| r7* = −19.497 | | | |
| | d7 = 3.050 | | |
| r8 = −9.116 | | | |
| | d8 = 0.800 | N4 = 1.80610 | ν4 = 40.73 |
| r9 = −66.494 | | | |

TABLE 6-continued

Embodiment 6

$f = 25.6 \sim 40.0 \sim 72.9$    $FNO = 5.84 \sim 7.41 \sim 10.01$

Aspherical Coefficient r1:

$\epsilon = 1.0000$
$A4 = -0.13978 \times 10^{-3}$
$A6 = 0.68411 \times 10^{-5}$
$A8 = 0.10693 \times 10^{-7}$
$A10 = -0.91714 \times 10^{-9}$
$A12 = -0.49494 \times 10^{-10}$ r2:

$\epsilon = 1.0000$
$A4 = 0.95216 \times 10^{-4}$
$A6 = 0.51358 \times 10^{-5}$
$A8 = 0.46181 \times 10^{-6}$
$A10 = -0.23276 \times 10^{-7}$
$A12 = 0.45202 \times 10^{-9}$ r6:

$\epsilon = 1.0000$
$A4 = 0.89456 \times 10^{-4}$
$A6 = -0.10848 \times 10^{-5}$
$A8 = 0.35978 \times 10^{-6}$
$A10 = -0.13663 \times 10^{-7}$
$A12 = 0.21200 \times 10^{-9}$
$A14 = -0.11339 \times 10^{-11}$ r7:

$\epsilon = 1.0000$
$A4 = -0.14647 \times 10^{-4}$
$A6 = 0.76009 \times 10^{-6}$
$A8 = 0.50691 \times 10^{-7}$
$A10 = 0.78688 \times 10^{-11}$
$A12 = -0.43403 \times 10^{-10}$
$A14 = 0.55865 \times 10^{-12}$

TABLE 7

Embodiment 7

$f = 23.2 \sim 34.0 \sim 43.8$    $FNO = 5.50 \sim 6.20 \sim 6.80$

| Radius of Curvature | Axial Distance | Refractive Index | Abbe Number |
|---|---|---|---|
| r1* = −14.800 | | | |
| | d1 = 1.700 | N1 = 1.84506 | ν1 = 23.66 |
| r2* = −20.252 | | | |
| | d2 = 3.312 | | |
| r3 = 69.919 | | | |
| | d3 = 2.755 | N2 = 1.48749 | ν2 = 70.44 |
| r4 = −8.738 | | | |
| | d4 = 0.800 | | |
| r5 = ∞(Diaphragm) | | | |
| | d5 = 9.312 ~ 4.754 ~ 2.564 | | |
| r6* = −29.042 | | | |
| | d6 = 2.500 | N3 = 1.62017 | ν3 = 24.01 |
| r7* = −18.275 | | | |
| | d7 = 3.584 | | |
| r8 = −8.924 | | | |
| | d8 = 0.800 | N4 = 1.72342 | ν4 = 37.99 |
| r9 = −58.279 | | | |

Aspherical Coefficient r1:

$\epsilon = 1.0000$
$A4 = -0.26776 \times 10^{-5}$

TABLE 7-continued

Embodiment 7 f = 23.2 ~ 34.0 ~ 43.8     FNO = 5.50 ~ 6.20 ~ 6.80

$A6 = 0.69725 \times 10^{-5}$
$A8 = 0.50810 \times 10^{-7}$
$A10 = -0.20813 \times 10^{-8}$
$A12 = -0.33754 \times 10^{-10}$ r2:

$\epsilon = 1.0000$
$A4 = 0.24136 \times 10^{-3}$
$A6 = 0.64669 \times 10^{-5}$
$A8 = 0.42869 \times 10^{-6}$
$A10 = -0.18713 \times 10^{-7}$
$A12 = 0.37974 \times 10^{-9}$ r6:

$\epsilon = 1.0000$
$A4 = 0.77958 \times 10^{-4}$
$A6 = 0.22118 \times 10^{-5}$
$A8 = 0.39015 \times 10^{-6}$
$A10 = -0.26261 \times 10^{-7}$
$A12 = 0.56827 \times 10^{-9}$
$A14 = -0.42225 \times 10^{-11}$ r7:

$\epsilon = 1.0000$
$A4 = 0.48729 \times 10^{-6}$
$A6 = 0.30491 \times 10^{-5}$
$A8 = 0.12081 \times 10^{-6}$
$A10 = -0.76666 \times 10^{-8}$
$A12 = 0.11044 \times 10^{-9}$
$A14 = -0.47104 \times 10^{-12}$

TABLE 8

Embodiment 8 f = 23.2 ~ 34.0 ~ 43.8     FNO = 5.74 ~ 6.20 ~ 6.80

| Radius of Curvature | Axial Distance | Refractive Index | Abbe Number |
|---|---|---|---|
| r1* = -14.970 | | | |
| | d1 = 1.700 | N1 = 1.84506 | ν1 = 23.66 |
| r2* = -20.320 | | | |
| | d2 = 3.577 | | |
| r3 = 70.758 | | | |
| | d3 = 3.283 | N2 = 1.48749 | ν2 = 70.44 |
| r4 = -8.812 | | | |
| | d4 = 1.000 | | |
| r5 = ∞(Diaphragm) | | | |
| | d5 = 9.136 ~ 4.562 ~ 2.364 | | |
| r6* = -26.729 | | | |
| | d6 = 2.500 | N3 = 1.62017 | ν3 = 24.01 |
| r7* = -17.038 | | | |
| | d7 = 3.584 | | |
| r8 = -8.690 | | | |
| | d8 = 0.800 | N4 = 1.69420 | ν4 = 39.56 |
| r9 = -65.045 | | | |

Aspherical Coefficient r1:

$\epsilon = 1.0000$
$A4 = 0.10614 \times 10^{-3}$
$A6 = 0.80984 \times 10^{-5}$
$A8 = 0.51777 \times 10^{-7}$
$A10 = -0.20828 \times 10^{-8}$
$A12 = -0.33776 \times 10^{-10}$

TABLE 8-continued

Embodiment 8 f = 23.2 ~ 34.0 ~ 43.8     FNO = 5.74 ~ 6.20 ~ 6.80 r2:

$\epsilon = 1.0000$
$A4 = 0.31615 \times 10^{-3}$
$A6 = 0.80354 \times 10^{-5}$
$A8 = 0.43500 \times 10^{-6}$
$A10 = -0.18699 \times 10^{-7}$
$A12 = 0.37975 \times 10^{-9}$ r6:

$\epsilon = 1.0000$
$A4 = 0.71571 \times 10^{-4}$
$A6 = -0.41851 \times 10^{-6}$
$A8 = 0.40008 \times 10^{-6}$
$A10 = -0.25565 \times 10^{-7}$
$A12 = 0.57050 \times 10^{-9}$
$A14 = -0.42312 \times 10^{-11}$ r7:

$\epsilon = 1.0000$
$A4 = -0.50606 \times 10^{-5}$
$A6 = 0.74298 \times 10^{-6}$
$A8 = 0.15850 \times 10^{-6}$
$A10 = -0.84091 \times 10^{-8}$
$A12 = 0.11539 \times 10^{-9}$
$A14 = -0.34681 \times 10^{-12}$

TABLE 9

| | Cond. (1),(3) | Cond. (2),(4) | Cond. (5) L1 | Cond. (5) L2 | Cond. (6) |
|---|---|---|---|---|---|
| Emb. 1 | 0.807 | 1.379 | -0.175 | -0.165 | -0.073 |
| Emb. 2 | 0.809 | 1.388 | -0.236 | -0.165 | -0.076 |
| Emb. 3 | 0.807 | 1.141 | -0.181 | -0.165 | -0.101 |

TABLE 10

| | Cond. (9) | Cond. (10) | Cond. (11) | Cond. (12) | Cond. (13) | Cond. (14) |
|---|---|---|---|---|---|---|
| Emb. 4 | 0.667 | 1.184 | -0.175 | 0.027 | 0.036 | 1.525 |
| Emb. 5 | 0.826 | 1.137 | -0.203 | 0.027 | 0.036 | 1.525 |
| Emb. 6 | 1.170 | 1.184 | -0.171 | 0.052 | 0.044 | 1.583 |
| Emb. 7 | 1.085 | 1.073 | -0.156 | 0.067 | 0.045 | 1.620 |
| Emb. 8 | 1.197 | 1.073 | -0.152 | 0.067 | 0.043 | 1.620 |

What is claimed is:

1. A zoom lens system comprising, from an object side of the zoom lens system a first lens unit having a positive optical power; and a second lens unit having a negative optical power, said second lens unit being provided at an image side of said first lens unit with a variable air space formed between said first and second lens units, wherein zooming from the shortest focal length condition to the longest focal length condition is performed by decreasing said variable air space, and wherein the zoom lens system fulfills the following conditions:

tan ωW ≧ 0.7; and $$1.25 < \frac{fT}{TLW} \cdot \tan\omega W < 1.5$$

where
- ωW represents a half angle of view in the shortest focal length condition;
- fT represents a focal length of the entire zoom lens system in the longest focal length condition; and
- TLW represents a total length of the entire zoom lens system in the shortest focal length condition.

2. A zoom lens system as claimed in claim 1, wherein an aspherical surface is formed either in said first or second lens units.

3. A zoom lens system as claimed in claim 1, wherein said first lens unit is constituted, from the object side, a first negative lens sub-unit, a diaphragm, a second negative lens sub-unit and a third positive lens sub-unit.

4. A zoom lens system as claimed in claim 1, wherein a most object side surface of said first lens unit is a concave shape.

5. A zoom lens system comprising, from an object side of the zoom lens system:
- a first lens unit having a positive optical power; and
- a second lens unit having a negative optical power, said second lens unit being provided at an image side of said first lens unit with a variable air space formed between said first and second lens units,
- wherein zooming from the shortest focal length condition to the longest focal length condition is performed by decreasing said variable air space, and
- wherein the zoom lens system fulfills the following conditions:

tan ωW ≧ 0.78; and $$1.0 < \frac{fT}{TLW} \cdot \tan\omega W \cdot < 1.5$$

where,
- ωW represents a half angle of view in the shortest focal length condition;
- fT represents a focal length of the entire zoom lens system in the longest focal length condition; and
- TLW represents a total length of the entire zoom lens system in the shortest focal length condition.

6. A zoom lens system as claimed in claim 5, wherein said first lens unit includes a first negative lens sub-unit and a second negative lens sub-unit provided at the image side of said first negative lens sub-unit, wherein said second negative lens sub-unit fulfills the following condition, $$-0.2 < \frac{CR1 - CR2}{CR1 + CR2} < -0.02$$

where,
- CR1 represents a radius of curvature of the most object side surface of said second negative lens sub-unit; and
- CR2 represents a radius of curvature of the most image side surface of said second negative lens sub-unit.

7. A zoom lens system as claimed in claim 5, wherein an aspherical surface is formed either in said first or second lens units.

8. A zoom lens system as claimed in claim 5, wherein said first lens unit is constituted, from the object side, a first negative lens sub-unit, a diaphragm, a second negative lens sub-unit and a third positive lens sub-unit.

9. A zoom lens system as claimed in claim 5, wherein a most object side surface of said first lens unit is a concave shape.

10. A zoom lens system comprising, from an object side of the zoom lens system:
- a first lens unit having a positive optical power, said first lens unit comprising, from the object side, a first negative lens sub-unit, a diaphragm, a second negative lens sub-unit and a third positive lens sub-unit; and
- a second lens unit having a negative optical power, said second lens unit being provided at an image side of said first lens unit with a variable air space formed between said first and second lens units,
- wherein zooming from the shortest focal length condition to the longest focal length condition is performed by decreasing said variable air space.

11. A zoom lens system as claimed in claim 10, wherein said second negative lens sub-unit is provided at an image side of said first negative lens sub-unit, and wherein said second negative lens sub-unit fulfills the following condition:
where, $$-0.2 < \frac{CR1 - CR2}{CR1 + CR2} < -0.02$$

- CR1 represents a radius of curvature of the most object side surface of said second negative lens sub-unit; and
- CR2 represents a radius of curvature of the most image side surface of said second negative lens sub-unit.

12. A zoom lens system comprising, from an object side of the zoom lens system:
- a first lens unit having a positive optical power, said first lens unit comprises, from the object side, a first negative lens sub-unit and a second positive lens sub-unit; and
- a second lens unit having a negative optical power, said second lens unit being provided at an image side of said first lens unit with a variable air space formed between said first and second lens units,
- wherein zooming from the shortest focal length condition to the longest focal length condition is performed by decreasing said variable air space, and
- wherein the zoom lens system fulfills the following conditions:

$$0.3 < \frac{T12}{TL} < 1.3$$

$$1.1 < \frac{fW}{Y'} < 1.3$$

where
- T12 represents a thickness of said second positive lens sub-unit of said first lens unit in the optical axis direction;
- TL represents a distance of the air space between said first negative and second positive lens sub-units in the optical axis direction;
- fW represents a focal length of the entire zoom lens system in the shortest focal length condition; and Y' represents a half diagonal distance of an image.

13. A zoom lens system as claimed in claim 12, wherein a most object side surface of said first lens unit is a concave shape.

14. A zoom lens system comprising, from an object side of the zoom lens system:

a first lens unit having a positive optical power; and a second lens unit having a negative optical power, said second lens unit being provided at an image side of said first lens unit with a variable air space formed between said first and second lens units, and said second lens unit comprising, from the object side, a first positive lens element and a second negative lens element, wherein zooming from the shortest focal length condition to the longest focal length condition is performed by decreasing said variable air space, and wherein the zoom lens system fulfills the following conditions:

$$0.055 < \frac{Np}{vp} < 0.07$$

$$0.035 < \frac{Nn}{vn} < 0.05$$

$$1.5 < Np < 1.65$$

where

Np represents a refractive index of said first positive lens element for d-line;

vp represents an Abbe number of said first positive lens element;

Nn represents a refractive index of said second negative lens element for d-line; and vn represents an Abbe number of said second negative lens element.

15. A zoom lens system as claimed in claim 14, wherein said first lens unit is constituted, from the object side, a first negative lens sub-unit and a second positive lens sub-unit, wherein the zoom lens system fulfills the following conditions:

$$0.3 < \frac{T12}{TL} < 1.3$$

$$1.1 < \frac{fW}{Y'} < 1.3$$

where,

T12 represents a thickness of said second positive lens sub-unit of said first lens unit in the optical axis direction;

TL represents a distance of the air space between said first negative and second positive lens sub-units in the optical axis direction;

fW represents a focal length of the entire zoom lens system in the shortest focal length condition; and Y' represents a half diagonal distance of an image.

16. A zoom lens system as claimed in claim 14, wherein said first lens unit includes a first negative lens sub-unit and a second negative lens sub-unit provided at the image side of said first negative lens sub-unit, wherein said second negative lens sub-unit fulfills the following condition:

$$-0.25 < \frac{CR1 - CR2}{CR1 + CR2} < -0.1$$

where,

CR1 represents a radius of curvature of the most object side surface of said second negative lens sub-unit; and CR2 represents a radius of curvature of the most image side surface of said second negative lens sub-unit.

17. A zoom lens system comprising, from an object side of the zoom lens system:

a first lens unit having a positive optical power; and a second lens unit having a negative optical power, wherein zooming from the shortest focal length condition to the longest focal length condition is performed by decreasing a variable air space formed between said first and second lens units, and wherein the zoom lens system fulfills the following conditions:

$$\tan \omega W \geq 0.7$$

$$1.25 < \frac{fT}{TLW} \cdot \tan\omega W < 1.5$$

where

ωW represents a half angle of view in the shortest focal length condition;

fT represents a focal length of the entire zoom lens system in the longest focal length condition; and TLW represents a total length of the entire zoom lens system in the shortest focal length condition.

18. A zoom lens system comprising, from an object side of the zoom lens system:

a first lens unit having a positive optical power; and a second lens unit having a negative optical power, wherein zooming from the shortest focal length condition to the longest focal length condition is performed by decreasing a variable air space formed between said first and second lens units, and wherein the zoom lens system fulfills the following conditions:

$$\tan \omega W \geq 0.78$$

$$1.0 < \frac{fT}{TLW} \cdot \tan\omega W < 1.5$$

where

ωW represents a half angle of view in the shortest focal length condition;

fT represents a focal length of the entire zoom lens system in the longest focal length condition; and TLW represents a total length of the entire zoom lens system in the shortest focal length condition.

19. A zoom lens system comprising, from an object side of the zoom lens system:

a first lens unit having a positive optical power; and a second lens unit having a negative optical power, said second lens unit being provided at an image side of said first lens unit with a variable air space formed between said first and second lens units, wherein zooming from the shortest focal length condition to the longest focal length condition is performed by decreasing said variable air space, wherein the zoom lens system fulfills the following conditions:

$$\tan \omega W \geq 0.7$$

$$1.25 < \frac{fT}{TLW} \cdot \tan \omega W < 1.5$$

where
ωW represents a half angle of view in the shortest focal length condition;
fT represents a focal length of the entire zoom lens system in the longest focal length condition; and
TLW represents a total length of the entire zoom lens system in the shortest focal length condition, and
wherein said first lens unit comprises a first negative lens sub-unit and a second negative lens sub-unit provided at an image side of said first negative lens sub-unit, wherein said second negative lens sub-unit fulfills the following condition:

$$-0.2 < \frac{CR1 - CR2}{CR1 + CR2} < -0.02$$

where
CR1 represents a radius of curvature of the most object side surface of said second negative lens sub-unit; and
CR2 represents a radius of curvature of the most image side surface of said second negative lens sub-unit.

* * * * *